(12) United States Patent
Matsuo et al.

(10) Patent No.: US 10,321,433 B2
(45) Date of Patent: Jun. 11, 2019

(54) WIRELESS COMMUNICATION DEVICE

(71) Applicant: KABUSHIKI KAISHA TOSHIBA, Minato-ku (JP)

(72) Inventors: Ryoko Matsuo, Shinagawa (JP); Hirokazu Tanaka, Bunkyo (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 15/264,178

(22) Filed: Sep. 13, 2016

(65) Prior Publication Data

US 2017/0078902 A1    Mar. 16, 2017

(30) Foreign Application Priority Data

Sep. 15, 2015   (JP) ................... 2015-182017

(51) Int. Cl.
*H04W 72/02*    (2009.01)

(52) U.S. Cl.
CPC .................... *H04W 72/02* (2013.01)

(58) Field of Classification Search
None
See application file for complete search history.

(56) References Cited

U.S. PATENT DOCUMENTS

| 8,363,630 | B2 | 1/2013 | Gong |
| 9,494,706 | B2 * | 11/2016 | Olsson ..................... G01V 3/17 |
| 9,781,724 | B2 | 10/2017 | Wang et al. |
| 2013/0286959 | A1 * | 10/2013 | Lou ...................... H04W 72/04 370/329 |

FOREIGN PATENT DOCUMENTS

| JP | 2013-501458 A | 1/2013 | |
| JP | 2014-509132 A | 4/2014 | |
| WO | WO 2010015971 A1 * | 2/2010 | ............ H04W 16/14 |
| WO | WO-2010015971 A1 * | 2/2010 | ............ H04W 16/14 |

* cited by examiner

*Primary Examiner* — Ayaz R Sheikh
*Assistant Examiner* — Debebe A Asefa
(74) *Attorney, Agent, or Firm* — Oblon, McClelland, Maier & Neustadt, L.L.P.

(57) ABSTRACT

According to one embodiment, a wireless communication device includes: a transmitter configured to transmit a first beacon signal through a first channel and transmit a second beacon signal through a second channel; and controlling circuitry configured to select the first channel from a first radio frequency band and select the second channel from a second radio frequency band. Use of the second radio frequency band is more limited than use of the first radio frequency band.

20 Claims, 20 Drawing Sheets

WIRELESS COMMUNICATION DEVICE

CROSS-REFERENCE TO RELATED APPLICATIONS

This application is based upon and claims the benefit of priority from Japanese Patent Application No. 2015-182017 filed Sep. 15, 2015; the entire contents of which are incorporated herein by reference.

FIELD

Embodiments described herein relate to a wireless communication device.

BACKGROUND

A network called a "body area network (BAN)" is known as a wireless network formed in a human body. In the body area network, a hub as a central device and a node as a terminal device are attached to, for example, the human body and communication is carried out between the hub and the node. SmartBAN which is a wireless communication standard of the BAN proposes a scheme of accessing the hub using two channels; a control channel and a data channel, aiming at low power consumption at the node. For example, three channels or so may be provided for the control channel. The control channel is preferably used in an environment with less interference than the data channel.

An ISM (industry-science-medical) band may be considered as a frequency band used in the body area network. In addition to the ISM-band, for example, use of a license band called a "medical band (M-band)" which is set adjacent to the ISM-band may also be considered. However, since the channel width of the M-band is small, it is difficult for all of various medical-related systems to use the M-band.

DETAILED DESCRIPTION

According to one embodiment, a wireless communication device includes: a transmitter configured to transmit a first beacon signal through a first channel and transmit a second beacon signal through a second channel; and controlling circuitry configured to select the first channel from a first radio frequency band and select the second channel from a second radio frequency band. Use of the second radio frequency band is more limited than use of the first radio frequency band.

Hereinafter, embodiments of the present invention will be described with reference to the accompanying drawings.

(First Embodiment)

Figure 1:
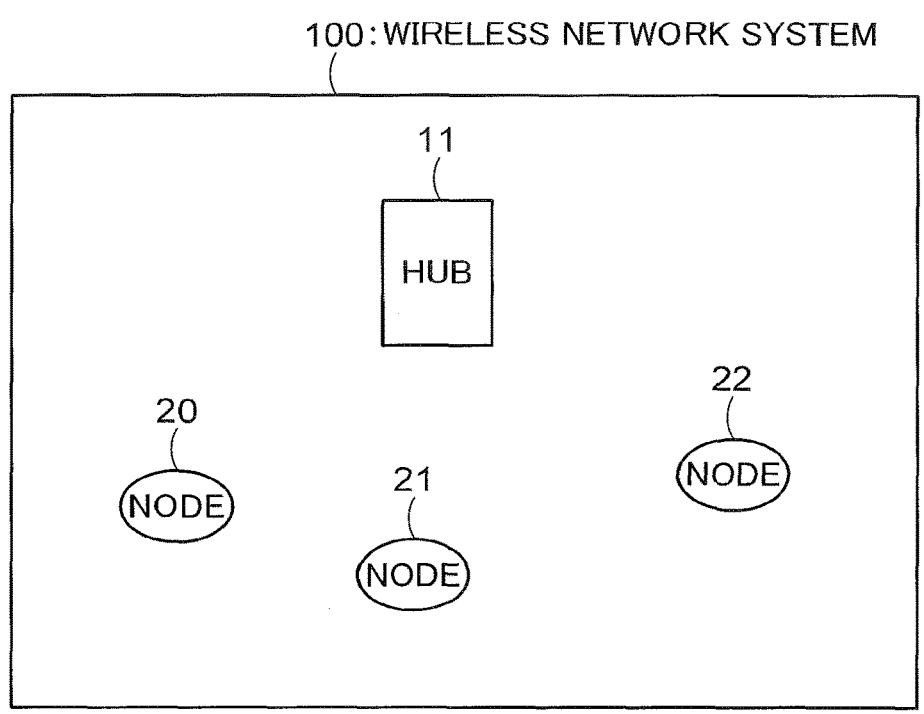
FIG. 1 is a diagram illustrating an example of a wireless network system according to a first embodiment.

FIG. 1 illustrates an example of a wireless network system according to a first embodiment. A wireless network system 100 shown in FIG. 1 includes a hub 10 and a plurality of nodes 20, 21 and 22. The hub 10 includes a wireless communication device that operates as a central device. Each node includes a wireless communication device that operates as a terminal with respect to the central device. The hub 10 and the nodes 20 to 22 are aspects of wireless communication terminals respectively.

In the present embodiment, the wireless network system in FIG. 1 is assumed to be a body network. In the body area network, each node and hub are attached to the human body. Attachment to the human body may include all cases of arrangement in a position close to the human body; attachment in direct contact with the human body, attachment from over the clothes, attachment to a string hanging from the neck, attachment by placement in a pocket. Each node incorporates, for example, one or a plurality of sensors. Examples of the sensors may be a biosensor such as a sleeping sensor, an acceleration sensor, a cardiogram sensor, a body temperature sensor, a pulse sensor. The hub wirelessly transmits a broadcast signal including control information necessary for communication with the hub to each node. Each node receives the broadcast signal, accesses the hub and thereby participates in a network. Each node that has connected to the hub wirelessly transmits sensor data acquired by sensors of the own node to the hub 10. The hub receives the sensor data transmitted from each node and thereby collects and manages the sensor data regarding a state of the human body.

The present embodiment is not limited to the body area network, but can construct any given network as long as it is possible to carry out communication between the hub and nodes arranged therein. For example, the hub and nodes may be arranged in a living body other than the human body, such as an animal or plant or may be arranged in an object other than living body such as a plurality of locations of an automobile (e.g., body and wheel).

Figure 2:
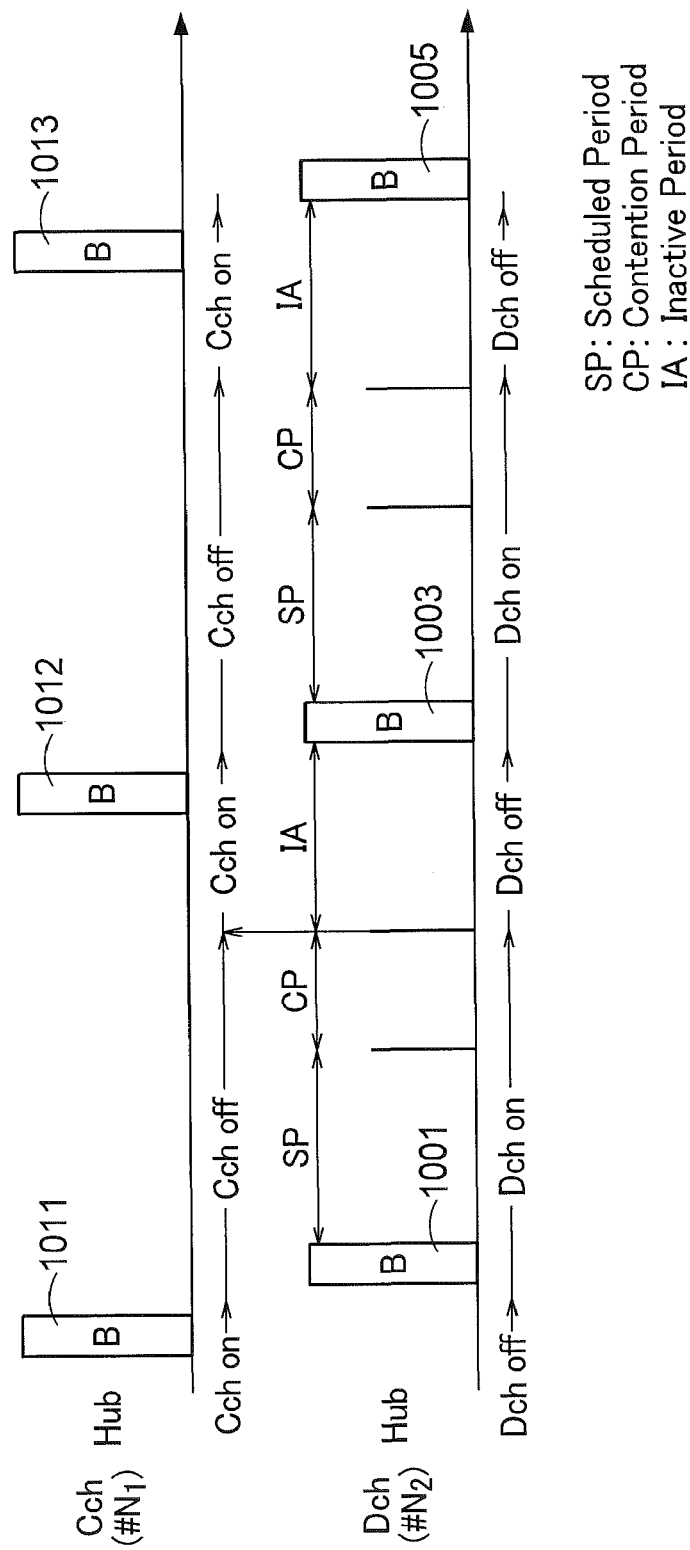
FIG. 2 is a timing chart of a hub.

FIG. 2 is a timing chart illustrating an example of operation of the hub according to a first embodiment. Using FIG. 2, operation between the hub and node will be described. In the present embodiment, the hub communicates with each node using a control channel (may also be described as "Cch") and a data channel (may also be described as "Dch") as operating channels. The control channel and the data channel are channels having different frequency bands from each other (central frequencies), and the channel widths may be the same or different.

The hub transmits beacon frame signals (beacon signals) through the control channel and the data channel respectively. A beacon frame is a broadcast frame that broadcasts basic information or control information of a network formed centered on the hub to nodes in the network. The beacon frame may be called a "broadcast frame" and the beacon signal may be called a "broadcast signal." Since the hub operates the control channel and the data channel, the hub may switch between the two channels so as to be operated as the operating channels. Alternatively, when the hub has a hardware configuration that can operate a plurality of channels simultaneously, the hub can use the control channel and the data channel simultaneously. The following description assumes a case where the hub operates the two channels while switching between the two.

The upper side in FIG. 2 shows a timing chart of a control channel and the lower side shows a timing chart of a data channel. For convenience, the control channel is identified by a channel number N1 and the data channel is identified by a channel number N2. In both diagrams on the upper and lower sides, the horizontal axis shows a time axis. A rectangle denoted by a character "B" represents a beacon signal.

A section marked "Cch on" in the diagram on the upper side indicates that the control channel is operating and a section marked "Cch off" indicates that the control channel is stopped. In this example, that the control channel is stopped more specifically means a state in which the data channel is set.

Similarly, in the diagram on the lower side, a section marked "Dch on" indicates that the data channel is operating and a section marked "Dch off" indicates that the data channel is stopped. That the data channel is stopped more specifically means a state in which the control channel is set.

The hub transmits control channel beacon signals (1011, 1012, 1013, . . . ) through the control channel at predetermined timing, for example, at a certain period. The control channel beacon signal includes information on the data channel (channel number, period of beacon signal transmitted through the data channel or the like). Beacon signals are generally transmitted by broadcasting, but can also be transmitted by multicasting.

The hub also transmits data channel beacon signals (1001, 1003, 1005 . . . ) through the data channel, for example, at predetermined timing, for example, at a certain period. The transmission timing of a control channel beacon signal is different from the transmission timing of a data channel beacon signal, but their transmission periods are the same. However, the transmission periods may be different from each other. An interval between beacon signals transmitted through the data channel is called a "beacon interval of the data channel."

The beacon interval of the data channel is provided with a scheduled period (SP), a contention period and an inactive period.

The scheduled period is a period during which the hub communicates with the node through TDMA (time division multiple access). Under the TDMA scheme, a period is divided into a plurality of time slots in the time direction and the hub assigns one or more time slots to each node connected to the hub. Each node can transmit or receive frames including data or the like in the slots assigned thereto. Note that time slots not assigned to any node may be used as shared slots. In this case, each node may be allowed to transmit frames using such shared slots in addition to time slots assigned to the own node.

The contention period is a period during which communication is carried out under a contention-based scheme such as CSMA or "slotted aloha." Under the slotted aloha scheme, a period is divided into a plurality of time slots and each time slot becomes a shared slot among nodes. When a node includes data to be transmitted, random numbers are generated and transmission or no transmission of the data is determined using a probability based on random numbers. When transmission is determined, frames including the data are transmitted in the corresponding time slot. When no transmission is determined, transmission is passed up. The relationship between random numbers and the probability can be changed as a parameter. Note that each node need not be assigned slots during the contention period. On the other hand, under the CSMA scheme, when the node includes data to be transmitted, the node performs carrier sensing for a certain time and a back-off time determined based on random numbers and if the carrier sensing result is idle, the node acquires a transmission right and transmits a frame including the data.

The inactive period is a period during which neither node nor hub performs transmission/reception through the data channel.

A beacon signal transmitted through the data channel notifies the period of the beacon signal and various kinds of information. Examples of the various kinds of information may include information on the number of assigned time slots or the number of unassigned time slots among all time slots. Information on the positions and lengths or the like of the scheduled period, contention period and inactive period may be included in a beacon signal of the data channel or a beacon signal of the control channel. The length of the beacon signal of the data channel is smaller than the length of the beacon signal of the control signal and has an amount of information which is minimum or less than that required for the node to continue communication with the hub. After being connected to the hub, the node may basically receive a beacon signal of the data channel. In this way, the power consumption of the node can be reduced compared to a case where a beacon signal of the control channel is monitored.

The method of switching between the control channel and the beacon channel or the switching timing may be optional. As an example, in an inactive period of the data channel, the operating channel may be changed from the data channel to the control channel to transmit a beacon signal of the control channel. After transmitting the beacon signal through the control channel, the control channel is re-changed to the data channel within the same inactive period. Thus, switching from the data channel to the control channel, transmission of a beacon signal through the control channel or switching from the control channel to the data channel may be performed within the inactive period. FIG. 2 shows an example of this case. When both the control channel and the data channel can be operated simultaneously, it is also possible to always operate both channels without changing the operating channel.

The hub may change the control channel or data channel to another channel (control channel candidate or another data channel candidate) to check to see whether a signal from another system (interference signal) is received or not. That is, the hub may check to see whether the channel is free or not. Furthermore, the hub may change the control channel or data channel to another channel (control channel candidate or data channel candidate) and check the channel operation status of a control channel or a data channel of another hub depending on whether a beacon signal is received from the other hub. For example, when a beacon signal transmitted from the other hub is received through the channel, it is possible to detect information of the control channel or data channel used in the other hub through the channel. Note that there may be a case where the other hub uses the same control channel (the same frequency) as that of the hub or a case where the other hub uses the control channel having a different frequency. Even when the same control channel is used, if the beacon signal has different transmission timing, both hubs can operate without any problem.

In order for the node to carry out data communication with the hub, the node needs to be connected to the hub first. By searching one or a plurality of control channel candidates, the node identifies a control channel used by the hub. The node identifies the control channel candidate through which the node has received a beacon signal from the hub as a control channel of the hub. The node detects information (data channel number or the like) on the data channel used by the hub by analyzing the beacon signal received by the control channel.

The node changes the operating channel from the control channel to the data channel and receives a beacon signal transmitted through the data channel. The node analyzes the beacon signal to detect the positions and lengths or the like of the scheduled period, the contention period and the inactive period. The node performs a connection process on the hub at any given timing for the contention period. Examples of the given timing include a startup time, a case where a data transmission request is generated, a case where a user instruction is received. As the connection process, the node transmits a connection request signal (C-Req) which is a signal including a connection request frame to the hub, receives a connection response signal (C-Ass) including a connection response frame from the hub and thereby establishes a connection with the hub. The hub assigns a time slot in the scheduled period to the node whose connection request is permitted and includes information on the assigned time slot in the connection response signal.

From the time at which the node is connected to the hub onward, the node basically sets the data channel as the operating channel. The node transmits data such as sensor data and receives a delivery confirmation response frame with respect to the data using the data channel. While data is not being transmitted or received, the node may transition to a sleep state which is a low power consumption state. In the sleep state, low power consumption can be achieved by stopping or reducing power supply to circuits such as the transmitter or the receiver (see FIG. 5) or by decreasing a clock frequency.

Figure 3:
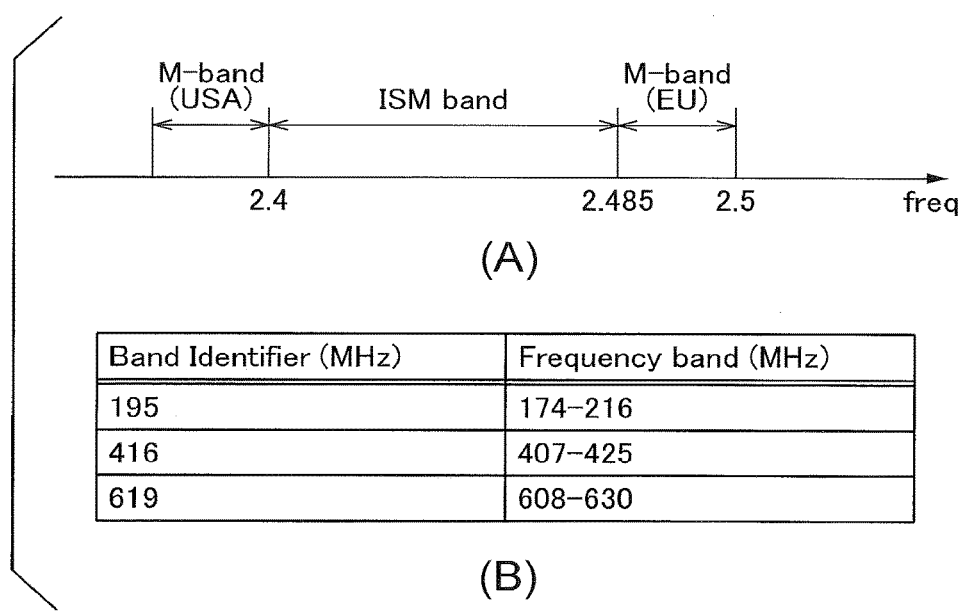
FIG. 3 is a diagram illustrating a medical band and an ISM band of each country.

Here, the present embodiment has one of features in the method of determining a control channel or data channel or both of these channels to be used. The present system assumes to use an ISM (industry-science-medical) band and a medical band (M-band) as frequency bands. The M-band is a medical band for application for specific medical care, health care devices and wearable devices such as a biosensor. Compared to the ISM-band intended for industry, science and medical care, the use of the M-band is limited to medical use. That is, the M-band has a narrower range than the ISM-band. There are countries where the M-band is not defined and even in countries where the M-band is defined, the frequency band varies from country to country. Moreover, some countries impose limitations on locations at which the M-band is used. The M-band may be subject to limitations of the communication scheme which is different from the ISM-band FIG. 3(A) illustrates a relationship between the M-band and the ISM-band in the USA and Europe (EP) as an example. FIG. 3(B) shows the M-band in China as an example. These bands are not always fixed but may be changed in the future. The M-band in the USA is 2.36 GHz to 2.40 GHz. Of this band, 2.36 GHz to 2.39 GHz is only usable indoors and 2.39 to 2.40 is also usable outdoors. In Europe, the M-band is 2.4385 GHz to 2.5 GHz. There is no limitation of location-dependency as in the case of the USA. 2.40 to 2.485 corresponds to the ISM-band. In China, M-bands are arranged at three separate locations. Each M-band is designed to be identified by values of central frequencies respectively.

Since the M-band is limited to uses related to medical care, low interference can be expected, but on the other hand, the M-band has a smaller width of frequency band than the ISM. For this reason, the M-band has fewer candidate channels that can be secured than the ISM-band. For example, in the case of a width of a 2 MHz channel currently being defined in SmartBAN, only 7 channels can be secured. Therefore, it is difficult for all various systems related to medical care to use the M-band. Thus, the present embodiment basically operates only the control channel in the M-band and operates the data channel in the ISM-band. The control channel is a channel to notify basic information of a network formed by the hub or control information, and is also a channel to notify information of the data channel necessary for the node to be connected to the hub. For this reason, the control channel is preferably able to operate stably, that is, have less interference.

Hereinafter, the basic configuration and operation of a wireless communication device mounted on the hub and a wireless communication device mounted on the node will be described.

Figure 4:
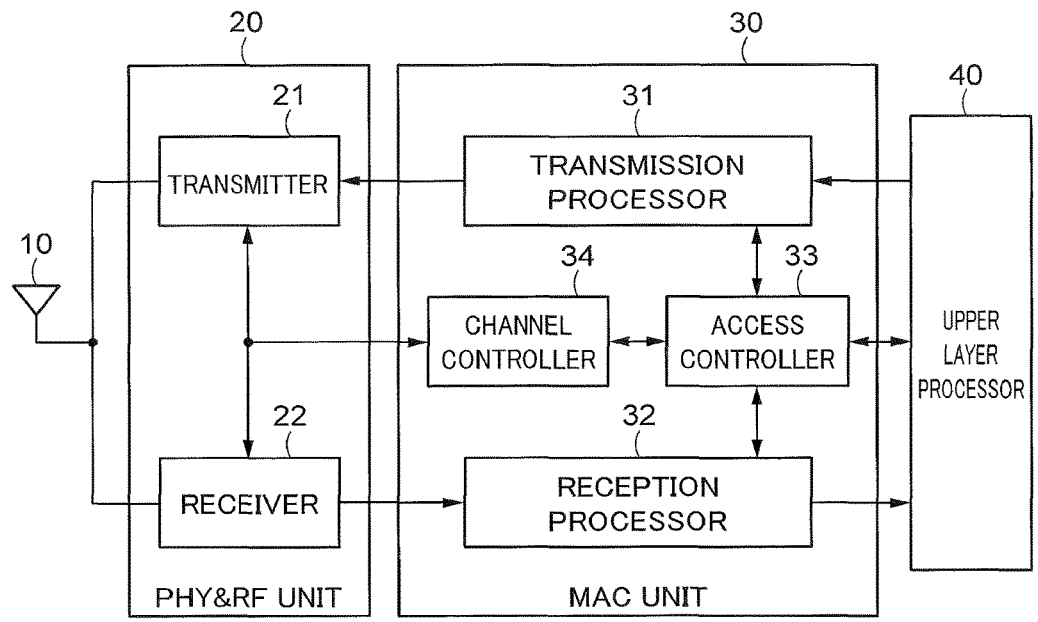
FIG. 4 is a block diagram of a wireless communication device provided for a hub.

FIG. 4 is a block diagram illustrating an example of a wireless communication device mounted on the hub of the present embodiment. The wireless communication device in FIG. 4 is provided with an antenna 10, a PHY&RF unit 20, a MAC unit 30 and an upper layer processor 40. The PHY&RF unit 20 includes a transmitter 21 and a receiver 22, the MAC unit 30 includes a transmission processor 31, a reception processor 32, an access controller 33 and a channel controller 34. The access controller 33 and the channel controller 34 may be configured as controlling circuitry. The "circuitry" may refer to not only electric circuits or a system of circuits used in a device but also a single electric circuit or a part of the single electric circuit.

The access controller 33 conducts a channel search for each ISM-band and each M-band to determine a control channel to be used and a data channel to be used.

For example, by setting one of control channel candidates set in the M-band in the transmitter 21 and the receiver 22, the access controller 33 checks to see whether there is a signal (interference signal) from another system other than the body area network system or a beacon signal from another hub of the body area network is received, and thereby determines whether the control channel candidate is free or not. The access controller 33 determines a control channel from among free control channel candidates. When the control channel candidate is set in the ISM-band, the access controller 33 may likewise conduct a channel search for the control channel candidates to detect a free control channel candidate. A channel search for the control channel candidates in the ISM-band may be conducted when no control channel candidate is found in the M-band.

Furthermore, the access controller 33 may conduct a channel search for data channel candidates set in the ISM-band to find a free candidate. That is, the transmitter 21 and the receiver 22 may set any one data channel candidate, check to see whether there is a signal (interference signal) from another system other than the body area network system or whether a beacon signal is received from another hub other than the body area network system or the like to thereby determine whether the data channel candidate is free or not. A data channel is determined from among free data channel candidates. When data channel candidates are set in the M-band, a channel search may be conducted for the data channel candidates set in the M-band. The channel search for the data channel candidates in the M-band may be conducted when no data channel is found in the ISM-band.

Here, to specify the M-band, the access controller 33 may acquire information on a country in which the hub is located from the upper layer processor 40 and determine whether the M-band is defined in the country in which the hub is currently located. For example, correspondence information which associates the country with the M-band is acquired from a storage and if the country in which the hub is currently located is registered with the correspondence information, the M-band corresponding to the country may be determined from the correspondence information. The upper layer processor 40 may communicate with an external device via a different wireless communicator that communicates with a system different from the body area network system to acquire country-related information. For example, the upper layer processor 40 may acquire information on the country using a GPS function or acquire the information through communication with a mobile device such as a smartphone held by a user. Here, in addition to the case where the definition of the M-band exists or not in country units, the definition of the M-band may exist or not in region units or in position units, and the M-band may be specified similarly in this case, too.

The access controller 33 checks a radio wave condition about at least one of the control channel in use and the data channel in use, and may determine whether or not to continue to use at least one of the control channel and the data channel (or whether or not to change the channel to another control channel candidate and another data channel candidate) depending on whether or not the operating condition of the control channel or the operating condition of the data channel is satisfied. Details of determination as to whether these operating conditions are satisfied or not will be described later.

The access controller 33 manages access of the control channel and the data channel. Through the data channel, the access controller 33 performs access management for each of the scheduled period, the contention period and the inactive period. The access controller 33 performs communication under a TDMA scheme for the scheduled period, and under a slotted aloha scheme or CSMA/CA or the like for the contention period.

The access controller 33 sets channels in the transmitter 21 and the receiver 22 via the channel controller 34. The channel controller 34 sets channels indicated from the access controller 33 in the transmitter 21 or reception 22 or both of them. When the transmitter 21 and the receiver 22 can simultaneously process a plurality of channels, the transmitter 21 and the receiver 22 may set both the control channel and the data channel respectively. When only one channel can be set in the transmitter 21 and the receiver 22 respectively, the access controller 33 switches between the control channel and the data channel as appropriate. The access controller 33 controls transmission of a beacon signal through the control channel and transmission of a beacon signal on the data channel so as to be carried out at desired timing (certain period or the like). When transmitting a beacon signal, the access controller 33 instructs the transmission processor 31 to transmit the beacon signal, the transmission processor 31 generates a beacon frame for the control channel or the data channel according to the instruction and outputs the generated beacon frame to the transmitter 21.

The transmitter 21 transmits the frame inputted from the transmission processor 31 using the channel set by the channel controller 34 as the operating channel. To be more specific, the transmitter 21 processes a desired physical layer for the frame inputted from the transmission processor 31. The transmitter performs D/A conversion and up-conversion to a radio frequency on the frame after the process of the physical layer, generates an analog signal of a radio frequency and outputs the analog signal into the space as a radio wave via the antenna 10.

The access controller 33 may change the channel to the control channel via the channel controller 33 using the starting of the inactive period as a trigger and transmit a beacon signal of the control channel. After completion of transmission of the beacon signal through the control channel, the access controller 33 may output an instruction for changing the channel to the data channel to the channel controller 34 so as to be in time for transmission of a beacon signal through the control channel. The channel controller 34 changes the operating channel of the transmitter 21 and the receiver 22 to the data channel based on the instruction. Note that in the present embodiment, the access controller 33 controls channel settings of the transmitter 21 and the receiver 22 via the channel controller 34, but the channel controller 34 may be omitted and the access controller 33 may directly control the channel settings of the transmitter 21 and the receiver 22. Note that in the transmission of the M-band, there may be a case where it is required to perform carrier sensing for at least a certain period before transmission of a signal and acquire a transmission right. In this case, carrier sensing may be conducted before transmitting a beacon signal and the beacon signal may be transmitted after acquiring the transmission right.

After changing the set channels of the transmitter 21 and the receiver 22 to data channels, the access controller 33 performs control so as to transmit a beacon signal through the data channel at predetermined timing.

The access controller 33 manages and controls a beacon signal interval that follows the transmission of the beacon signal by dividing the beacon signal interval into three periods; scheduled period, contention period and inactive period. The lengths or the like of the scheduled period and the contention period may be notified using a beacon signal of a data frame. The scheduled period and the contention period may be determined in advance by the system or specification or the like. In this case, when changing these periods, changes of these periods may be notified using beacon signals of the data channel.

When the hub determines to change the data channel to another data channel candidate, the hub may notify information on the changed data channel using a beacon signal of the data channel or the control channel.

The receiver 22 receives a signal via the antenna 10, performs a reception process and outputs the processed frame to the reception processor 32. The reception process may include desired physical layer processes such as conversion from a radio frequency to a baseband, analysis of a physical header of the frame after A/D conversion, and a demodulation process. The reception processor 32 analyzes the processed frame. In the case of a connection request frame from the node, the reception processor 32 analyzes the frame and notifies the analysis result from the connection request frame to the access controller 33. The access controller 33 determines a response to the connection request of the node and instructs the transmission processor 31 to transmit the connection response frame according to the determination result. In this case, if the connection request frame includes information on the sensor type corresponding to the node or information similar thereto, the access controller 33 may notify the information to the upper layer processor 40 and the upper layer processor 40 may determine the number of time slots assigned to the node and the position or the like. In this case, information on the time slots assigned to the node is included in the connection response frame. When the reception processor 32 determines that the received frame is a data frame through an analysis of the MAC header or the like, the reception processor 32 outputs the data of the data frame to the upper layer processor 40.

Note that when there is data to be individually transmitted from the hub to the node, the upper layer processor 40 passes the data to the transmission processor 31. The access controller 33 instructs the transmission processor 31 to transmit the data to the node using any given method (e.g., method using a beacon signal of the data channel) through a downlink time slot secured for a scheduled period. The transmission processor 31 generates a data frame including the data and outputs the data frame to the transmitter 21 in accordance with the instruction from the access controller 33.

Figure 5:
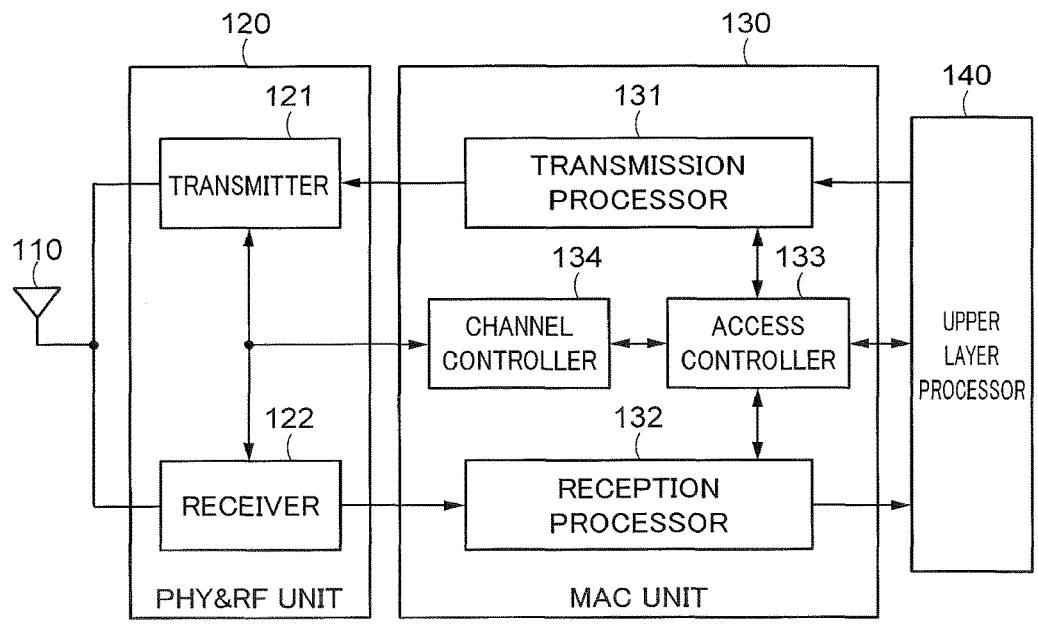
FIG. 5 is a block diagram of a wireless communication device provided for a node.

FIG. 5 shows a block diagram of a wireless communication device provided for the node according to the present embodiment. The wireless communication device in FIG. 5 is provided with an antenna 110, a PHY&RF unit 120, a MAC unit 130 and a upper layer processor 140. The PHY&RF unit 120 includes a transmitter 121 and a receiver 122, and the MAC unit 130 includes a transmission processor 131, a reception processor 132, an access controller 133 and a channel controller 134. The upper layer processor 140 may include a function to acquire sensing information such as sensor data and a sensing time. The access controller 133 and the channel controller 134 may be configured as controlling circuitry. The "circuitry" may refer to not only electric circuits or a system of circuits used in a device but also a single electric circuit or a part of the single electric circuit.

The access controller 133 conducts a channel search for at least one of the M-band and the ISM-band to detect the control channel. For example, the access controller 133 instructs the channel controller 134 to set one of control channel candidates set in the M-band in the receiver 122, and the channel controller 134 sets the one control channel candidate in the receiver 122. When the access controller 133 receives a beacon signal from the hub via the receiver 122 and the reception processor 132 through the control channel candidate, the access controller 133 recognizes the candidate as the control channel. Furthermore, the access controller 133 may set one of data channel candidates set in the ISM-band in the receiver 122 and if a beacon signal can be received from the hub through the data channel candidate, the access controller 133 may recognize the candidate as the control channel. Note that there can also be a case where no control channel candidate is set in the ISM-band. The access controller 133 receives a beacon signal through the control channel, analyzes the beacon signal and thereby acquires information on the data channel. The access controller 133 sets the data channel in the transmitter 121 and the receiver 122 via the channel controller 134. The access controller 133 analyzes the beacon signal received through the data channel and thereby detects positions and lengths of the scheduled period and the contention period or the like.

When no M-band is specified in advance, the access controller 133 may make a channel search using each of the M-band candidates and attempt to detect a control channel. Alternatively, the access controller 133 may acquire information on a country in which the node is located via the upper layer processor 140 and determine whether the M-band is defined in the country from the correspondence information between the country and the M-band. In the case of a country in which the M-band is defined, the access controller 133 may make a channel search for the control channel using the M-band corresponding to the country. In the case of a country in which the M-band is not defined, the access controller 133 may make a channel search of the ISM-band and attempt to detect a control channel.

The upper layer processor 140 issues a connection request to the access controller 133 at predetermined timing such as at the startup or when transmission data is generated. The access controller 133 instructs the transmission processor 131 to transmit a connection request frame based on the connection request from the upper layer processor 140 for a contention period, for example. The transmission processor 131 generates a connection request frame and outputs the connection request frame to the transmitter 121. The transmitter 121 performs a desired process of the physical layer on the connection request frame. The transmitter 121 performs D/A conversion and up-conversion to a radio frequency on the frame after the process of the physical layer and generates a transmission signal (connection request signal). The transmitter 121 outputs the transmission signal into a space via the antenna 110 as a radio wave. The access controller 133 waits to receive the connection response signal transmitted from the hub. The receiver 122 receives a signal via the antenna 110, performs a reception process and outputs the processed frame to the reception processor 132. The reception process includes desired physical layer processes such as frequency conversion to a baseband, A/D conversion, analysis of a physical header of the frame after A/D conversion or demodulation process. The reception processor 132 analyzes the processed frame and if the reception processor 132 detects that the frame is a connection response frame, the reception processor 132 notifies the information that the frame is included in the connection response frame to the access controller 133. Thus, the access controller 133 detects and manages the number and the positions of time slots assigned to the own node, for example.

The upper layer processor 140 outputs data to be transmitted to the transmission processor 131 and outputs a transmission request to the access controller 133. Examples of the data include sensor data acquired by a sensor such as a biosensor, results of processing on the sensor data by application or a current state of the node, but the data is not limited to these examples. Note that the upper layer processor 140 may also output the data type together with the data. The data type may be the type of a sensor mounted for the node or the degree of importance determined from the value of the sensor data, for example. Alternatively, the data type may be a value indicating whether the sensor is abnormal or normal. The data type may be used to determine whether the data is emergency data to be transmitted preferentially or not.

Upon receiving a data transmission request, the access controller 133 instructs the transmission processor 131 to transmit the data. The transmission processor 131 generates a data frame including the data received from the upper layer processor 140 and outputs the data frame to the transmitter 120 at timing instructed from the access controller 133. The access controller 133 controls transmission timing so that the data is transmitted within a time slot assigned to the own node in the scheduled period or a contention period. For example, when the transmission of the data is in time for the transmission in the time slot of the own node at the current beacon interval, the transmission processor 131 transmits the data using the time slot, and on the other hand, when the transmission of the data is not in time for the transmission in the time slot and there is a possibility that the transmission of the data may be in time for the transmission in the contention period, the transmission processor 131 attempts to transmit the data in a contention period. If there is a free time slot among the time slots not assigned to the own node within the scheduled period, data may be transmitted using the time slot. The transmission using the time slot may be limited to emergency data. When emergency data is transmitted within the contention period, the transmission may be controlled so that the data may be transmitted with a higher probability than that of normal data. For example, in the case of a slotted aloha scheme, parameters may be set so that the transmission probability increases. In the case of a CSMA/CA scheme, Contention window or Backoff value or both of them may be set to be smaller than normal data.

Furthermore, when no transmission is scheduled such as when no transmission request is inputted from the upper layer processor 140 for a certain period of time, the access controller 133 may cause the own node to transition to a sleep state. For example, access controller 133 may stop (stop or limit power supply) operation of at least one of the transmitter 121 and the receiver 120.

The access controller 133 may acquire information on the country in which the own node is located from the upper layer processor 140 and determine whether or not the M-band is set in the country in which the own node is currently located. For example, correspondence information that associates the country with the M-band may be acquired from the storage and when the country in which the own node is currently located is registered, the M-band corresponding to the country may be specified from the correspondence information. For example, the upper layer processor 40 may acquire information on the country from an external device via another wireless communication device which is not shown. The upper layer processor 40 may acquire the information using a GPS function or may acquire the information via communication with a mobile device such as a smartphone held by the user.

Hereinafter, details of the operation of determining the control channel and the data channel by the hub will be described.

Figure 6:
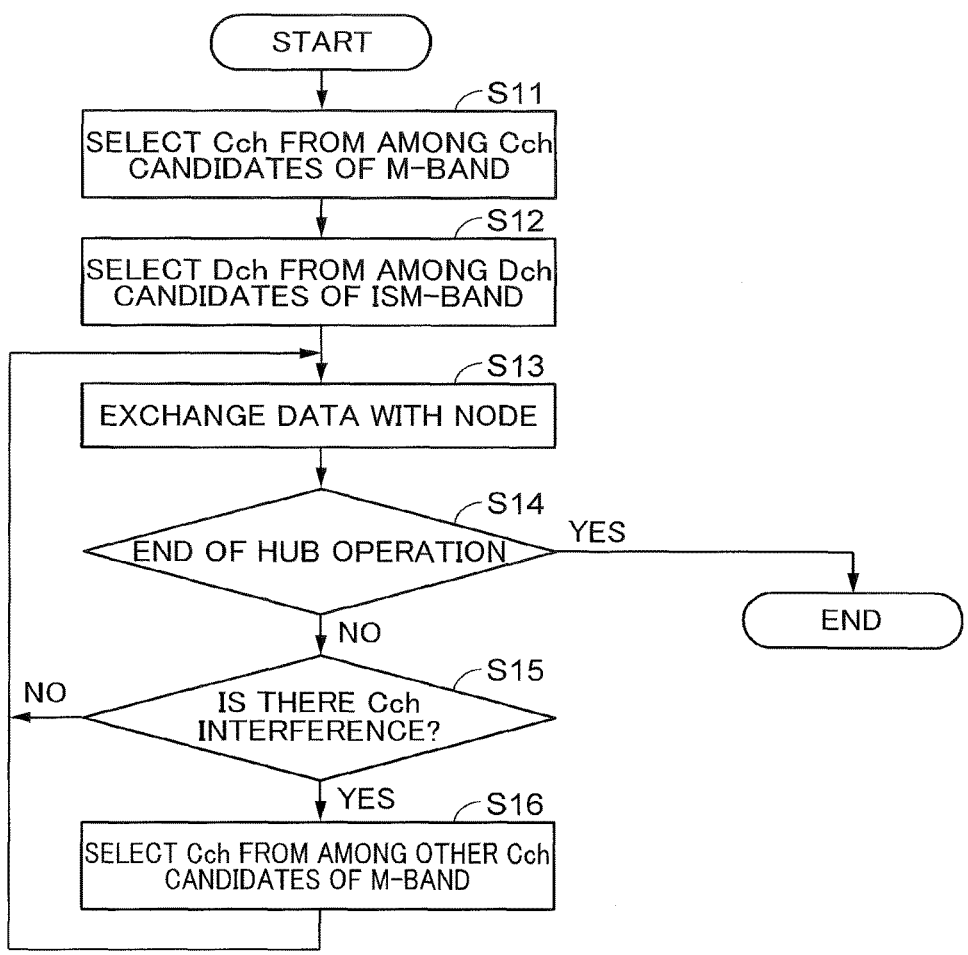
FIG. 6 is a flowchart of a first operation example of a hub.

FIG. 6 is a flowchart illustrating an example of operation by the hub of selecting the control channel and the data channel. A plurality of control channel (Cch) candidates are set in the M-band in advance and a plurality of data channel (Dch) candidates are set in the ISM-band in advance.

The hub selects one candidate from among a plurality of control channel candidates of the M-band as a control channel (S11). For example, the hub may scan the control channel candidates and select a free candidate. The free candidate may be, for example, a candidate which receives no beacon signal from another hub or in which no interference signal is observed from the other system. However, even a candidate that receives a beacon signal from the other hub may also be used without interference if transmission timing of the beacon signal is different. For this reason, if there exists a period during which a beacon signal can be transmitted, the period can be selected as a free candidate. The hub that has selected the control channel determines the transmission cycle, and transmission timing or the like of the beacon signal to be transmitted through the control channel. The transmission cycle and transmission timing may be selected from among a plurality of candidates defined by the standard or the system or may be determined optionally.

The hub selects one candidate from among a plurality of data channel candidates of the ISM-band as the data channel (S12). For example, the hub may scan data channel candidates and select a free candidate. Since the data channel is a channel that not only transmits a beacon signal periodically but also individually communicates with each node, a channel which has not selected any other adjacent hub is preferably selected. However, the same data channel can also be selected by shifting the transmission timing of a beacon signal in conjunction with the other adjacent hub and making a setting so that the scheduled periods do not overlap each other, or the like.

The hub operates the control channel selected in step S11 and the data channel selected in step S12 and transmits beacon signals periodically through the respective channels. When the hub receives a connection request signal from the node, the hub assigns time slots or the like and carries out data communication with the node using the time slots. For example, when the hub receives a data frame including sensor data from the node in the time slot and successfully receives the data frame, the hub returns a delivery acknowledgment frame (ACK frame) (S13).

When the hub receives an instruction such as stoppage of operation (e.g., power supply off) from outside, the hub terminates the process (S14). For example, an instruction for a power supply off may be inputted from the user via an input interface.

The hub determines, regularly or at arbitrary timing, whether to continue to use the current control channel or change the control channel to another candidate depending on whether the radio wave condition satisfies the operating condition or not (S15).

For example, when it is necessary to acquire a transmission right by performing carrier sensing before transmitting a beacon signal through the control channel, a busy rate of carrier sensing may be acquired as information indicating the radio wave condition. For example, the number of times carrier sensing becomes busy and the beacon signal is not successfully transmitted (or transmission timing is delayed) may be counted and the busy rate may be calculated based on a ratio between the number of busy times and the number of times transmission of a beacon signal is attempted. When the busy rate exceeds a threshold, this may be considered as indicative that the operating condition is not satisfied (interference exists or the like) and it may be determined that the control channel should be changed to another candidate.

Alternatively, a beacon signal transmitted from the other hub through the same channel as the control channel may be observed and the number of beacon signals observed may be acquired as information indicating a radio wave condition. When the number of beacon signals exceeds a threshold, this may be considered as indicative that the operating condition is not satisfied (there exists interference or there is a high possibility that interference may occur) and it may be determined that the control channel should be changed to another candidate.

Alternatively, the number of times or the length of time a signal transmitted from another system different from the body area network is received may be measured as a radio wave condition. When the number of times or the length of time (or a statistical value of average of the number of times or statistical value of average of length of time) a signal transmitted from the other system is received exceeds a threshold during a transmission interval of beacon signals of the control channel, this may be considered as indicative that the operating condition is not satisfied (there exists interference or there is a high possibility that interference may occur) and it may be determined that the control channel should be changed to another candidate. Note that regarding identification of signals transmitted from the other system, if, for example, decoding of the signal fails, this may be determined as the signal transmitted from the other system.

When the hub determines not to change the control channel, the hub continues to operate the current control channel. On the other hand, when the hub determines to change the control channel, the hub selects another free control channel candidate from the M-band through a channel search or the like and changes the control channel to the selected candidate (S16). When the control channel is changed, each node is notified of information such as the control channel number and change timing or the like after the change using a beacon signal of the control channel before the change or a beacon signal of the data channel or both beacon signals. The transmission timing and transmission period on the changed control channel may be the same as before the change or at least one of the transmission timing and transmission period may be changed.

Thus, by selecting the control channel from the M-band whose use is more limited than the ISM-band and selecting the data channel from the ISM-band, it is possible to stably operate the control channel in an environment with less interference. For example, when a new node is added, it is possible to avoid such a situation that the node cannot receive the beacon signal through the control channel and the node cannot be connected to the hub.

Figure 7:
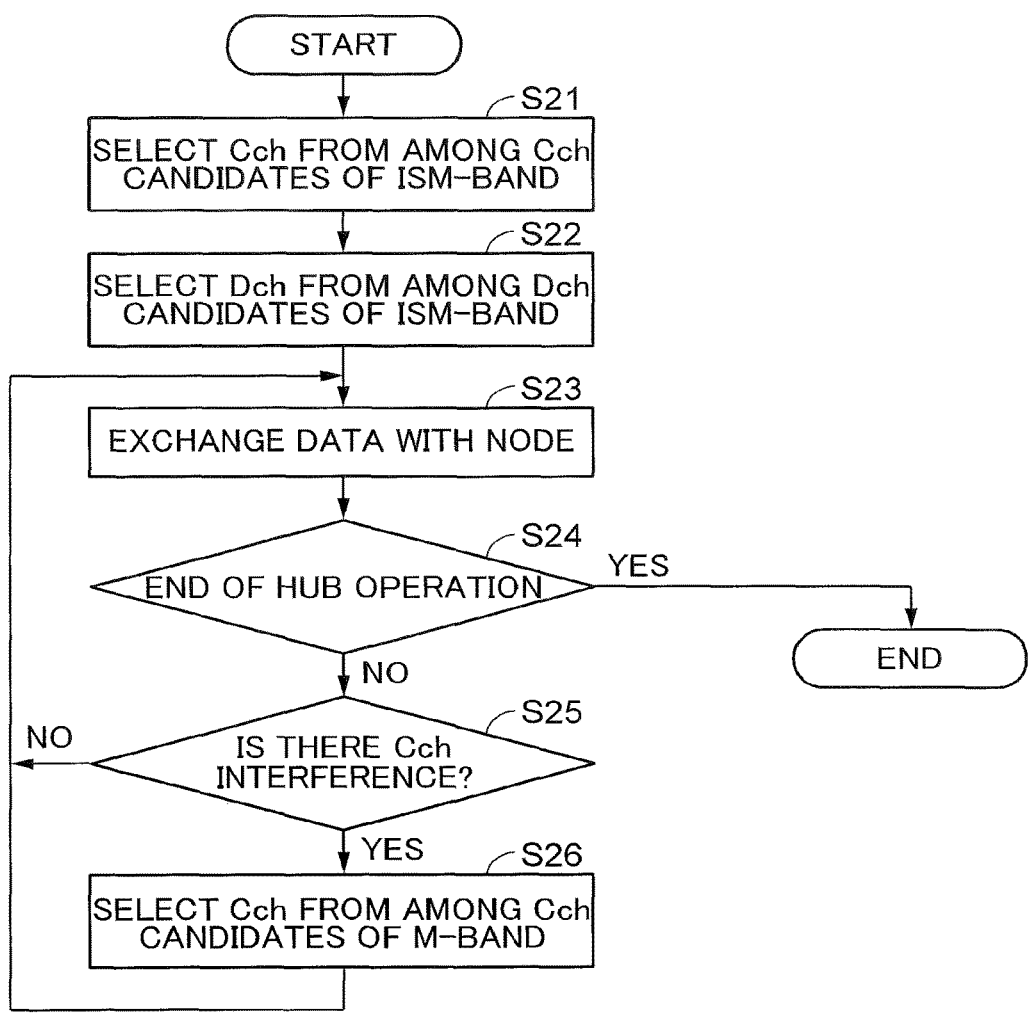
FIG. 7 is a flowchart of a second operation example of the hub.

In the operation flow in FIG. 6, control channel candidates are provided only for the M-band and a control channel is always selected from the M-band, but it is also possible to provide control channel candidates for the ISM-band and preferentially select a control channel from the ISM-band. By selecting a control channel from the ISM-band, it is possible to save the M-band. FIG. 7 shows a flowchart of operation in this case.

As a premise, a plurality of control channel candidates are set in the M-band and a plurality of control channel candidates and a plurality of data channel candidates are set in the ISM-band in advance. Note that there may also be a case where not a plurality of control channel candidates but only one control channel candidate is set in the M-band and the ISM-band.

The hub selects one control channel from among the plurality of control channel candidates of the ISM-band (S11). The method of selecting the control channel may be optional. For example, control channel candidates may be channel-scanned and a free candidate may be selected. The free candidate may be a candidate which does not receive any beacon signal from the other hub, and in which no interference signal from the other system different from the body area network is observed. However, even if the free candidate is a candidate which receives a beacon signal from the other hub, if the transmission timing of a beacon signal is different, the candidate may be used without interference. For this reason, if there exists a period during which a beacon signal can be transmitted, the control channel candidate may be one to be selected as a free candidate. The hub that has selected the control channel determines a transmission period and transmission timing or the like of a beacon signal to be transmitted through the control channel. The transmission period and transmission timing may be selected from among a plurality of candidates defined by the standard or system, for example, or may be determined autonomously.

Steps S22, S23, S24 and S25 are similar to those in the flowchart in FIG. 6, and therefore description thereof will be omitted.

In step S25, when it is determined that the operation condition is not satisfied and the control channel should therefore be changed, a control channel candidate is selected from the M-band (S26). Alternatively, when another candidate in the ISM-band is free, the candidate may be selected and when all candidates are not free, a control channel may be selected from the M-band. Thus, it is possible to save the M-band better.

Figure 8:
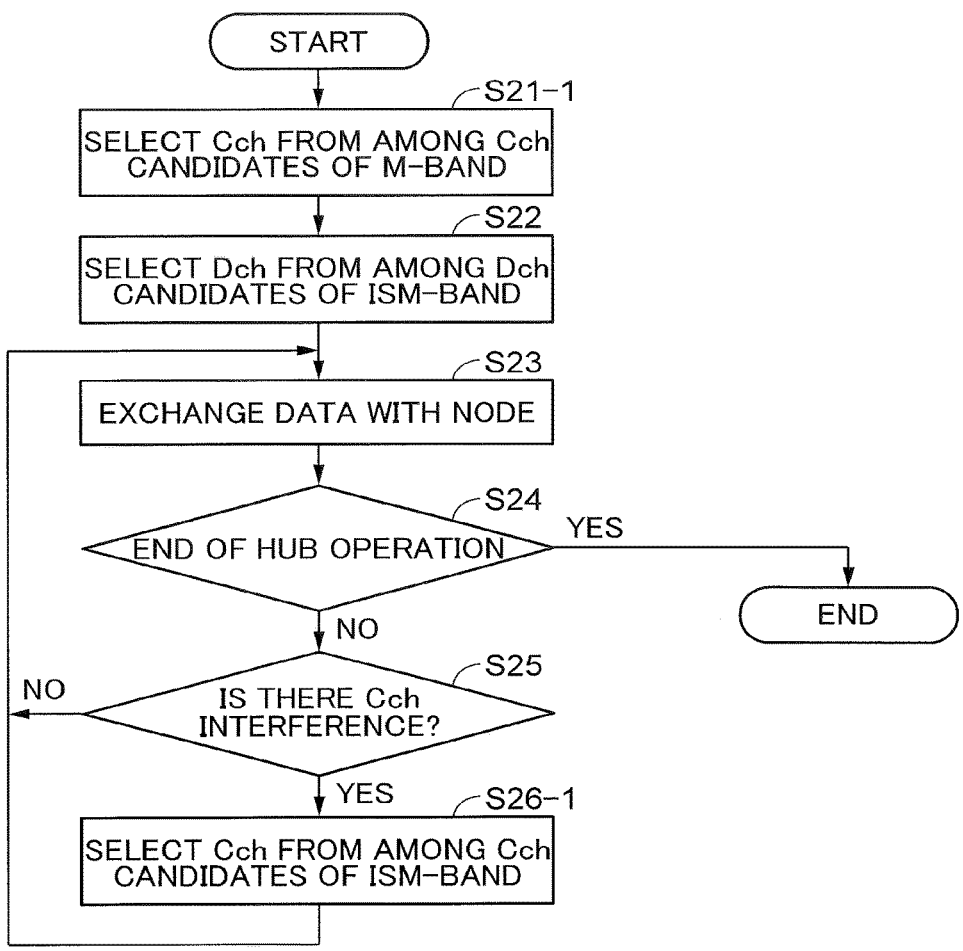
FIG. 8 is a flowchart of a third operation example of the hub.

In the operation flow in FIG. 7, a control channel is preferentially selected from the ISM-band, but as a modification, a control channel may be selected from the M-band in step S21 and a control channel may be selected from the ISM-band in step S26. FIG. 8 shows an operation flow in this case.

In step S21-1 in FIG. 8, a control channel is selected from the M-band, and in step S26-1, a control channel is selected from the ISM-band. Other steps are similar to those in FIG. 7. Note that in step S26-1, when another candidate is free in the M-band, that candidate may be selected, and when there is no free candidate in the M-band, a control channel may be selected from the ISM-band. By operating in this way, even when there is no free M-band candidate, it is possible to continue to operate the control channel by selecting a control channel from the ISM-band.

Figure 9:
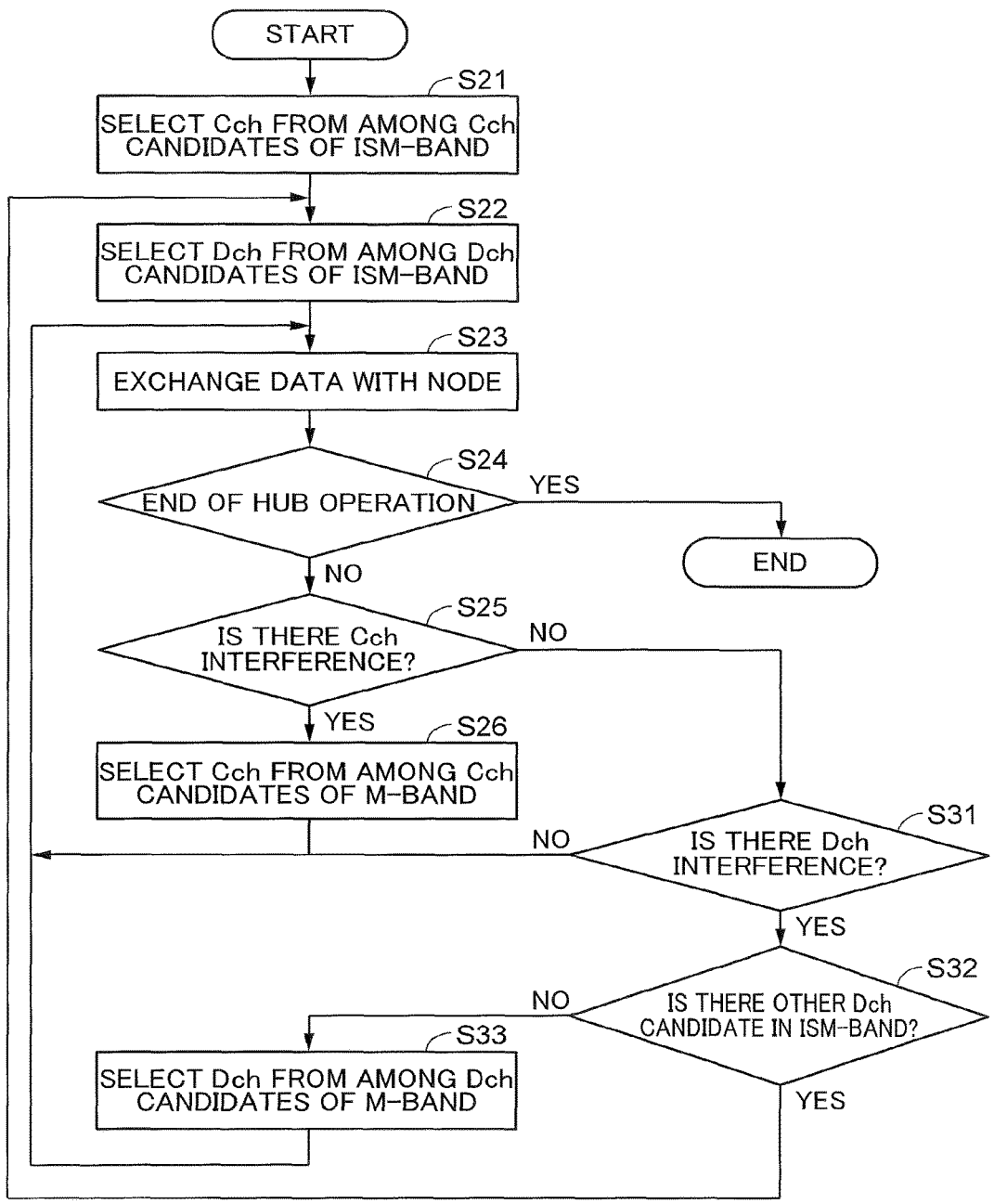
FIG. 9 is a flowchart of a fourth operation example of the hub.

In the operation flows in FIG. 6 to FIG. 8, the data channel is always selected from the ISM-band, but it is also possible to set one or a plurality of data channel candidates in the M-band and select, when there is no free candidate among candidates in the ISM-band, a data channel from among data channel candidates in the M-band. FIG. 9 shows an operation flow in this case. In this example, new steps S31, S32 and S33 are added to the operation flow in FIG. 7. It is also possible to add similar steps to the operation flow in FIG. 6 or FIG. 8 and obtain a modification similar to that in FIG. 7.

After determining not to change the control channel in step S25, it is determined in step S31 whether the current data channel continues to be used, that is, whether the data channel is changed to another candidate depending on whether the radio wave condition of the data channel satisfies the operating condition or not (S31).

For example, the frame error rate is measured, and when the frame error rate is equal to or higher than a certain value, this may be considered as indicative that the operating condition is not satisfied (there is interference or the like) and the data channel should therefore be changed. The frame error rate may be average of a frame error rate with respect to the plurality of nodes connected to the hub or may be a frame error rate of any one node.

Furthermore, when a signal is observed by the data channel and an interference signal of certain intensity or higher is observed during an inactive period, this may be considered as indicative that the operating condition is not satisfied (there is interference or there is a high possibility that interference may occur or the like) and it is determined that the data channel should be changed. When such interference signals of certain intensity or higher are observed continuously at a plurality of beacon intervals, it may be determined that the data channel should be changed. Thus, when an interference signal is generated due to a temporary factor, it is possible to prevent the data channel from being changed.

Furthermore, when a beacon signal of the other hub is observed in the data channel, this may be considered as indicative that the operating condition is not satisfied (there is interference), and it may be determined that the data channel should therefore be changed to another candidate.

Upon determining to change the data channel to another candidate, the hub determines, through channel scanning, whether there is another free candidate in the ISM-band or not, and when there is another free candidate, the hub selects the candidate (step S32). Candidates checked by channel scanning may be all candidates or a certain number of candidates or may be candidates determined using a predetermined method. For example, when there are 37 data channel candidates in the ISM-band, 36 data channels except the current data channel may be channel-scanned or a certain randomly defined number of candidates may be scanned or every certain number of candidates from a data channel of a predetermined number (e.g., number of the current data channel) may be scanned or candidates to be scanned may be determined using other methods. The method of determining candidates may be determined optionally or determined in advance by a standard or specification.

When no free candidate exists in the ISM-band, a data channel is selected from among data channel candidates of the M-band (S33). For example, channel scanning is carried out using a method similar to that in step S22 and a free candidate is selected as a data channel.

Thus, when no data channel can be secured from the ISM-band, a data channel may be secured from the M-band and data communication between the hub and the node can thereby be continued.

Figure 10:
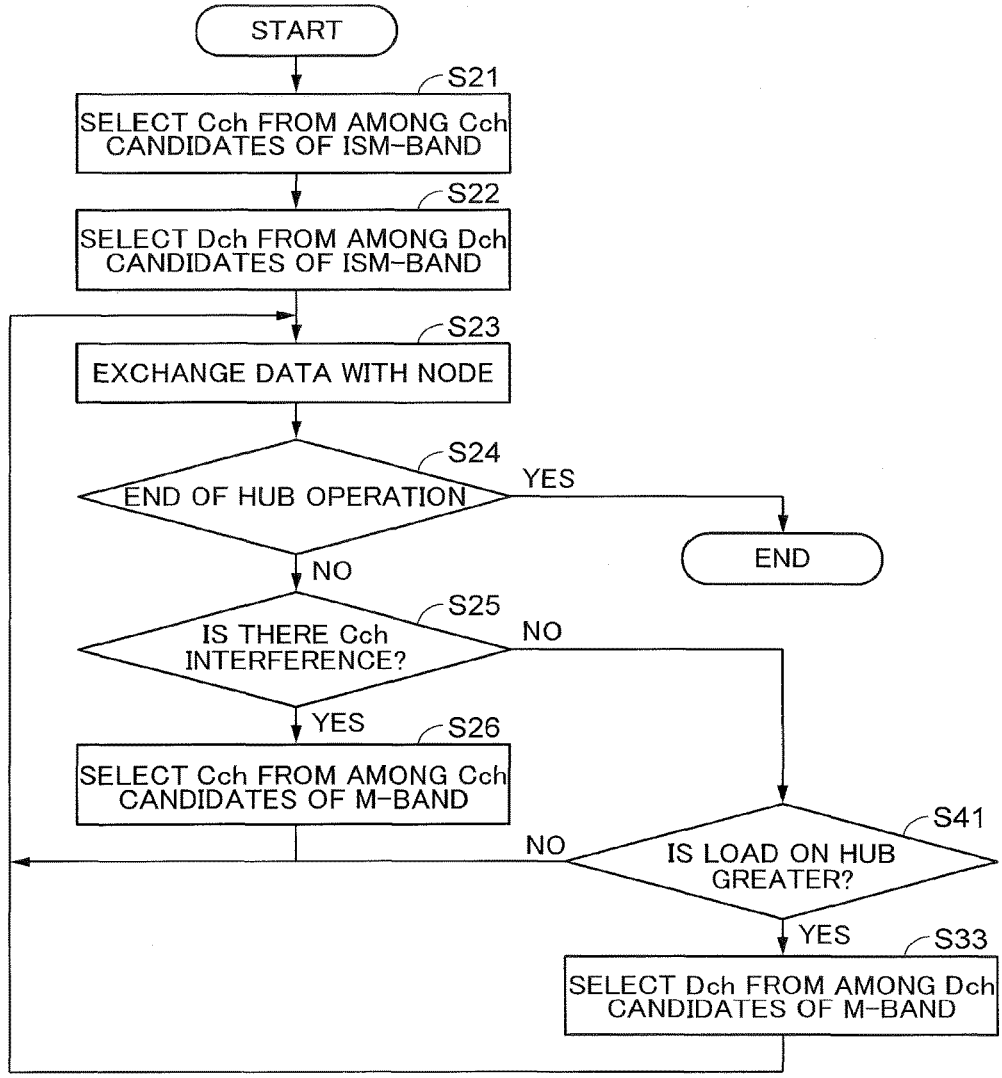
FIG. 10 is a flowchart of a fifth operation example of the hub.

In steps S31 and S32, it is determined whether the data channel is changed to a channel in the M-band or not depending on whether there is another free candidate in the ISM-band or not, but it is also possible to determine whether the data channel should be changed to a channel in the M-band or not depending on a communication load on the hub. FIG. 10 shows an operation flow in this case. Steps S31 and S31 in FIG. 9 are changed to step S41.

For example, when many nodes are connected to the hub or assigned time slots occupy a large proportion of the scheduled period, a large communication load is imposed on the hub, and therefore efficient communication is preferred. If interference and/or reception errors occur frequently in such a case, incidence of data retransmission increases, the communication load on the hub increases and the system efficiency deteriorates. Therefore, it is preferable in such a case to change the channel to a data channel of the M-band in which stable operation can be expected. Thus, it is determined in step S41 whether the communication load on the hub is large or not according to the situation of communication with the node, it may be possible to determine to select, when the communication load is large, the data channel from the M-band and change the channel over to the selected data channel. For example, when the number of nodes connected to the hub is equal to or greater than a threshold, it may be possible to determine to select a data channel from among data channel candidates of the M-band and change the channel over to the selected data channel. Alternatively, when the proportion of assigned time slots in the scheduled period is equal to or greater than a threshold, it may be possible to determine to select a data channel from among data channel candidates of the M-band and change the channel over to the selected data channel. The load on the hub may be assessed using any method other than those mentioned here.

Figure 11:
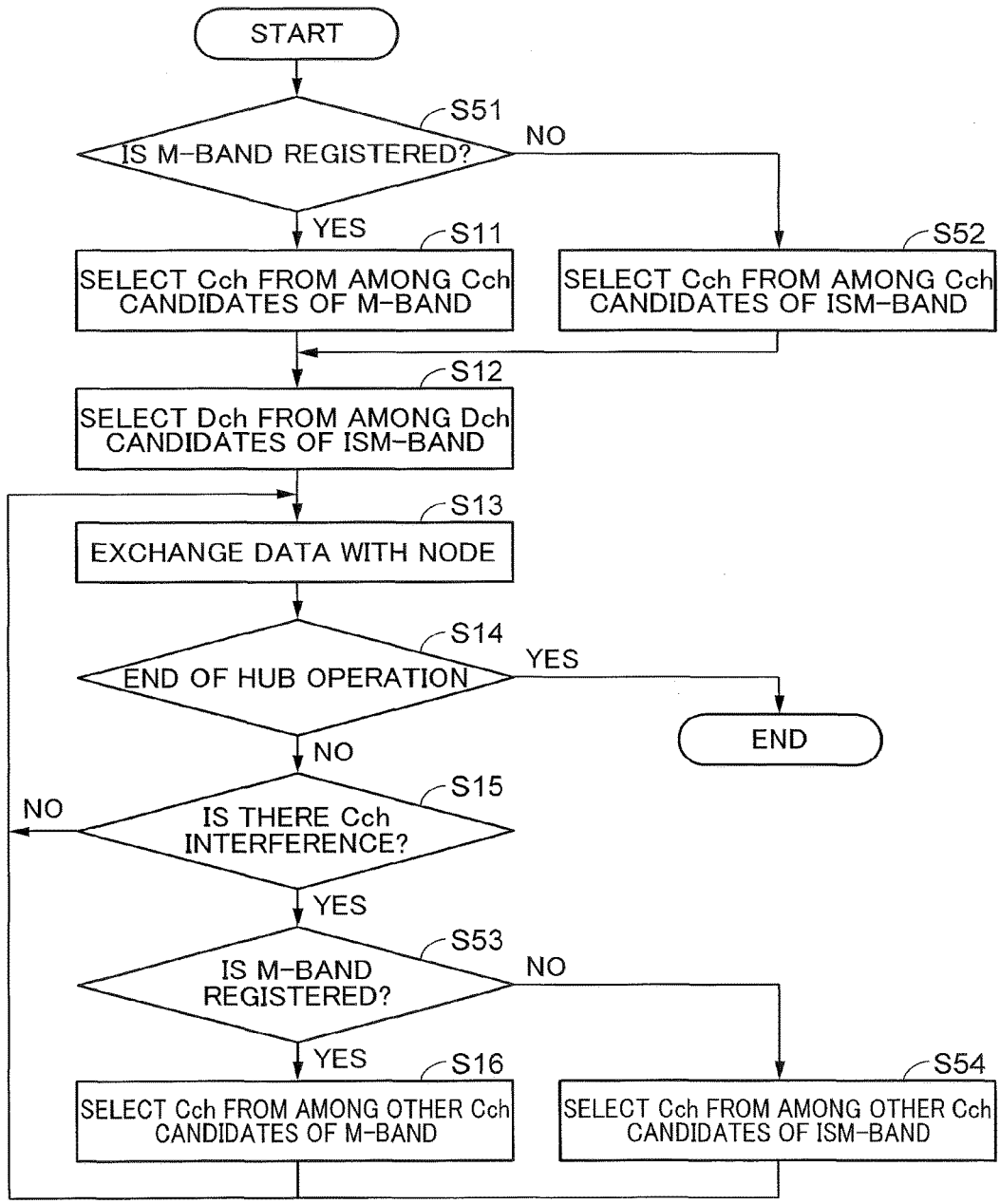
FIG. 11 is a flowchart of a sixth operation example of the hub.

The description in the operation flows in FIG. 6 to FIG. 10 presupposes that both the ISM-band and the M-band are defined, but there are countries where no M-band is defined. Furthermore, even in countries where the M-band is defined, the position of the M-band varies from one country to another. Thus, as a modification of the operation flow in FIG. 6, the hub determines the presence or absence of the M-band, selects, when the hub successfully specifies the M-band, a control channel from the M-band and selects, when the hub cannot specify the M-band, a control channel from the ISM-band. FIG. 11 shows an operation flow in this case. Steps S51, S52, S53 and S54 are added to the operation flow in FIG. 6. Steps identical to or corresponding to those in FIG. 6 are assigned identical reference numerals.

The hub determines the presence or absence of the M-band first (S51). When correspondence information between a country and the M-band is stored, the hub acquires information that identifies the country in which the hub is located. When the country indicated by the information is registered, the hub identifies the M-band from the correspondence information. When the country is not registered with the correspondence information, the hub determines that it is not possible to specify the M-band (that the M-band does not exist). As a specific example, when the hub is mounted with GPS, the hub may acquire positional information from the GPS and specify the country from the positional information. Alternatively, when the hub is accessible to a system different from the body area network (e.g., wireless LAN), the hub may acquire information on the country from the different system. For example, when the hub can be connected to a wireless LAN, the hub may receive a beacon frame regularly transmitted from an access point of the wireless LAN, and when the beacon frame describes the country as an information element, the hub may specify the country from the beacon frame. On the other hand, when the hub is accessible to a mobile terminal (e.g., smartphone) held by the user, the hub may receive country information from the mobile terminal. The country may be specified by the name of the country or a corresponding identifier or may be specified within a range of longitude and latitude. The country is taken as an example here, but when the M-band is present or absent depending on the region or position, a determination may be made in a similar manner. The region may be specified within a range of longitude and latitude or may be specified by name.

As another specific example of determining the presence or absence of the M-band, a plurality of M-band candidates may be set in the hub in advance, candidates may be respectively channel-scanned to check to see whether it is possible to detect a control channel of the body area network. When a control channel can be detected, the M-band to which the detected control channel belongs may be specified as the currently available M-band.

When the hub can specify the M-band, the hub selects a control channel from among control channel candidates of the M-band (S11) and selects, when the M-band cannot be specified, a control channel from among control channel candidates of the ISM-band (S52).

Furthermore, when the change of the control channel is determined (Yes in S53) in step S15, the hub specifies a control channel from among the other candidates of the M-band if the M-band is specified (Yes in S53) (S16), and selects a control channel from among the other control channel candidates of the ISM-band if the M-band is not specified (No in S53) (S54).

Thus, a control channel is selected from the M-band when the M-band can be specified and a control channel is selected from the ISM-band when the M-band cannot be specified, and it is thereby possible to appropriately determine the control channel in accordance with an available band (frequency band).

Figure 12:
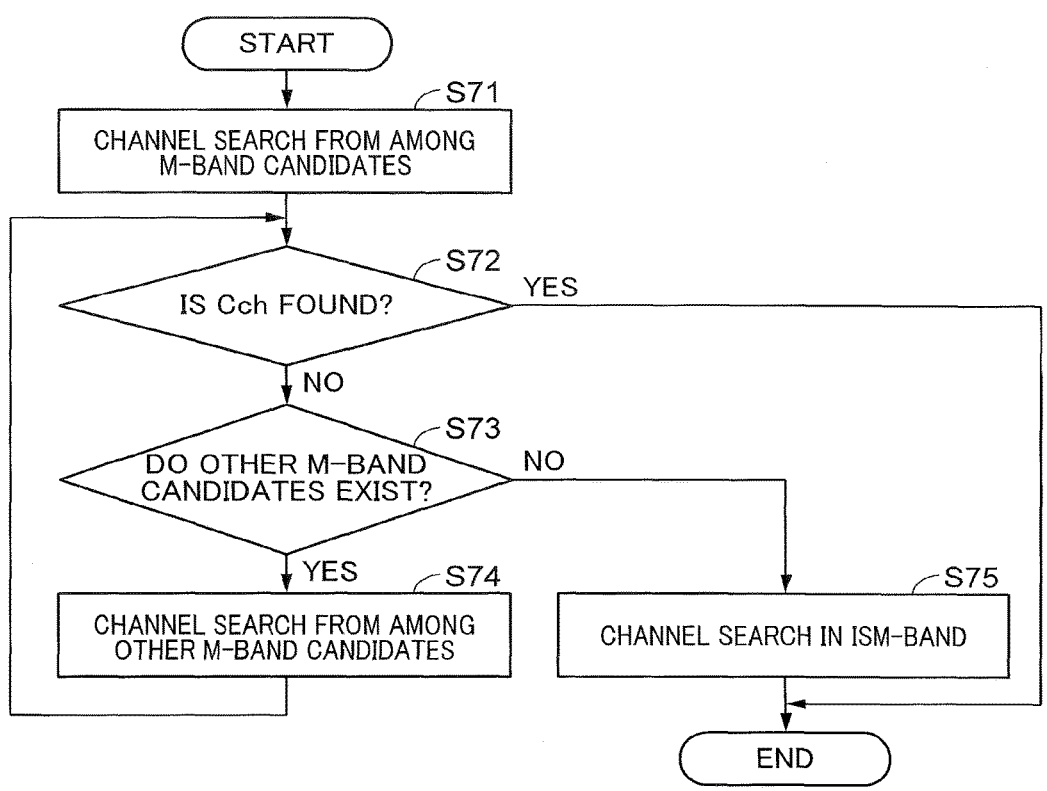
FIG. 12 is a flowchart of an operation example of a node.

FIG. 12 is a flowchart of an operation example of the node according to the present embodiment. The node conducts a channel search for a control channel using one of the plurality of M-band candidates to specify a control channel used by the hub (S71). As an example, a control channel candidate is predetermined for each M-band candidate and a search is conducted depending on whether each candidate can receive a beacon signal or not. When a control channel can be found (S72), the node detects a data channel based on the beacon signal received through the control channel. When the control channel cannot be found, the node determines whether there is any other M-band candidate for which no channel search has been conducted yet (S73), and when such a control channel exists, the node specifies one M-band from among the other M-band candidates and conducts a channel search for a control channel (S74). When the control channel can be found (S72), the data channel is detected based on the beacon signal received through the control channel. When the control channel cannot be found, a similar process is repeated until a channel search is conducted with all the M-band candidates. When no control channel can be found with any M-band candidates, the node determines that there is no M-band, the node conducts a channel search with the ISM-band (S75) and finds a control channel from the ISM-band. As an example, one or a plurality of control candidates are determined in advance with the ISM-band and the node specifies the candidate that has successfully received a beacon signal as a control channel among the respective candidates.

When specifying an M-band candidate in step S71, the node may acquire information on the country in which the node is currently located and determine, from correspondence information between the country and the M-band whether the M-band is defined in the country or not. In the case of the country where the M-band is defined, the node may conduct a channel search for a control channel using the M-band corresponding to the country in the correspondence information. When no control channel is found, a channel search may be conducted using the ISM-band (S75).

A case where a control channel is selected from the M-band and a case where a control channel is selected from the ISM-band have been described in the operation flows in FIG. 6 to FIG. 12. Moreover, a case where a data channel is selected from the M-band and a case where a data channel is selected from the ISM-band also have been described. Operating conditions of the hub and the node may have been set depending on the band. Therefore, the hub and the node operate the control channel or the data channel or both of them so as to satisfy the operating condition according to the band used.

For example, when the hub transmits a beacon signal, it is defined that in the M-band, carrier sensing is performed for a certain period of time before transmission, whereas no such condition is defined in the ISM-band. In this case, in the ISM-band, the hub transmits a beacon signal at predetermined timing, whereas in the M-band, the hub performs carrier sensing a certain period of time ahead of the timing, and if the carrier sensing result shows an idle state, the hub transmits a beacon signal at the timing, and if the carrier sensing result shows a busy state, the hub does not transmit any beacon signal. Alternatively, the hub operates so as not to transmit any beacon signal until an idle state is set. Note that as a method of determining a busy or idle state of carrier sensing, a case where average received power for a period during which carrier sensing is being carried out exceeds a threshold may be determined as a busy state and a case where average received power falls below a threshold may be determined as an idle state. A busy or idle state may be determined using other methods as well.

The presence or absence of carrier sensing before transmission of a beacon signal has been described as the operating condition for each band, but operating conditions other than that may be defined. For example, lengths of the scheduled period, the contention period and the inactive period in the data channel may be different between the M-band and the ISM-band. Furthermore, the arrangement order of the scheduled period, the contention period and the inactive period may be different. Moreover, the presence or absence of the contention period or inactive period may be different.

In addition, the length of the carrier sensing time in the node for a period under a contention-based access scheme may be different between the M-band and the ISM-band. For example, a longer carrier sensing time may be set for the M-band than for the ISM-band. In this case, the node is assumed to change the carrier sensing time in accordance with the band used.

In the present embodiment, two bands; ISM-band and M-band, have been mainly assumed, but frequency bands other than these bands may also be used. The present embodiment is likewise applicable to a plurality of frequency bands of different operation limitations. Operations similar to those described so far are possible by associating the frequency band with strong operation limitations with the M-band and associating the frequency band with weak operation limitations with the ISM-band. Furthermore, the ISM-band may be a different frequency band instead of a 2.4 GHz band, such as 10.3 MHz band.

As described so far, according to the present embodiment, it is possible to implement a body area network system having strong resistance against interference by effectively using an M-band which has operation limitations but has fewer channels that can be secured and an ISM-band which has many channels that can be secured but is more susceptible to interference from other systems.

(Second Embodiment)

Figure 13:
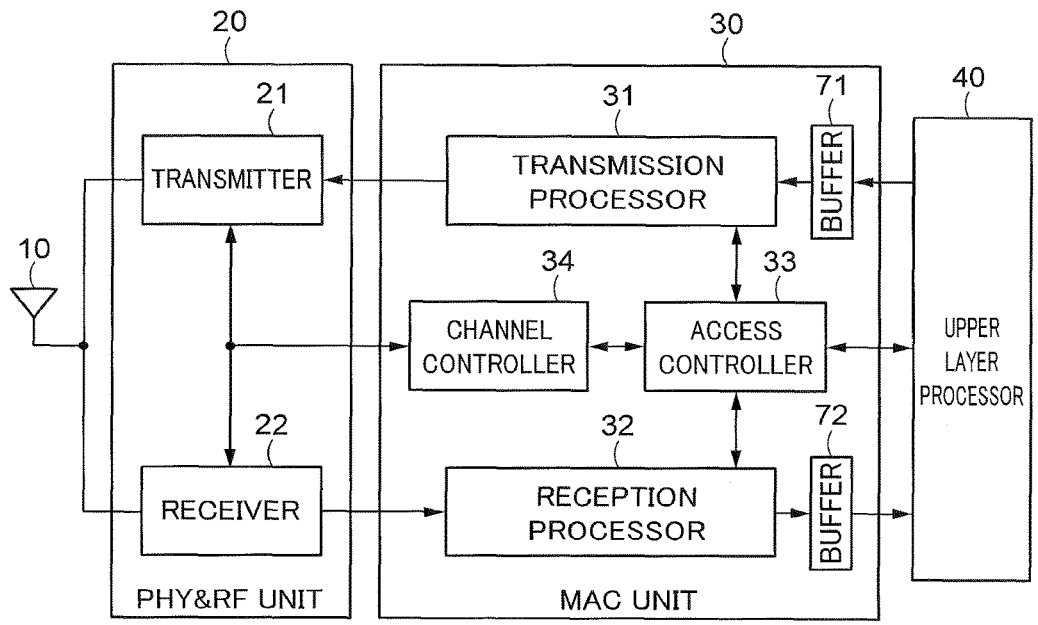
FIG. 13 is a block diagram of a wireless communication device provided for a hub according to a second embodiment.

FIG. 13 shows a block diagram of a hub including a wireless communication device according to a second embodiment.

In the hub shown in FIG. 13, buffers 71 and 72 are added to the MAC unit 30 of the wireless communication device according to the first embodiment shown in FIG. 4. The buffers 71 and 72 are connected to the transmission processor 31 and the reception processor 32. The upper layer processor 40 performs input and output with the transmission processor 31 and the reception processor 32 through the buffers 71 and 72. The buffers 71 and 72 can be, for example, arbitrary volatile memories or non-volatile memories. In this way, the buffers 71 and 72 can be provided to hold the transmission data and the reception data in the buffers 71 and 72. The retransmission process, QoS control according to the frame type etc. or the output process to the upper layer processor 40 can be easily performed.

The configuration of adding the buffers can be similarly applied to the node.

Figure 14:
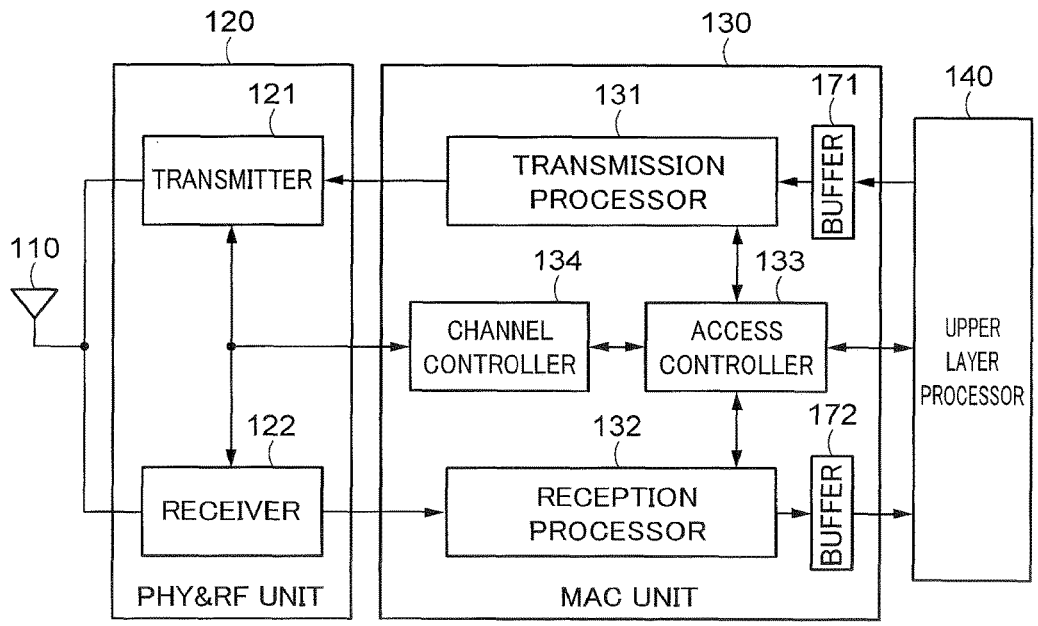
FIG. 14 is a block diagram of a wireless communication device provided for a node according to a second embodiment.

FIG. 14 shows a block diagram of a node including a wireless communication device according to a second embodiment.

In the node shown in FIG. 14, buffers 171 and 172 are added to the MAC unit 130 of the wireless communication device according to the first embodiment shown in FIG. 5. The buffers 171 and 172 are connected to the transmission processor 131 and the reception processor 132, respectively. The upper layer processor 140 performs input and output with the transmission processor 131 and the reception processor 132 through the buffers 171 and 172. The buffers 171 and 172 can be, for example, arbitrary volatile memories or non-volatile memories. In this way, the buffers 171 and 172 can be provided to hold the transmission data and the reception data in the buffers 171 and 172. The retransmission process, QoS control according to the frame type etc., or the output process to the upper layer processor 140 can be easily performed.

(Third Embodiment)

Figure 15:
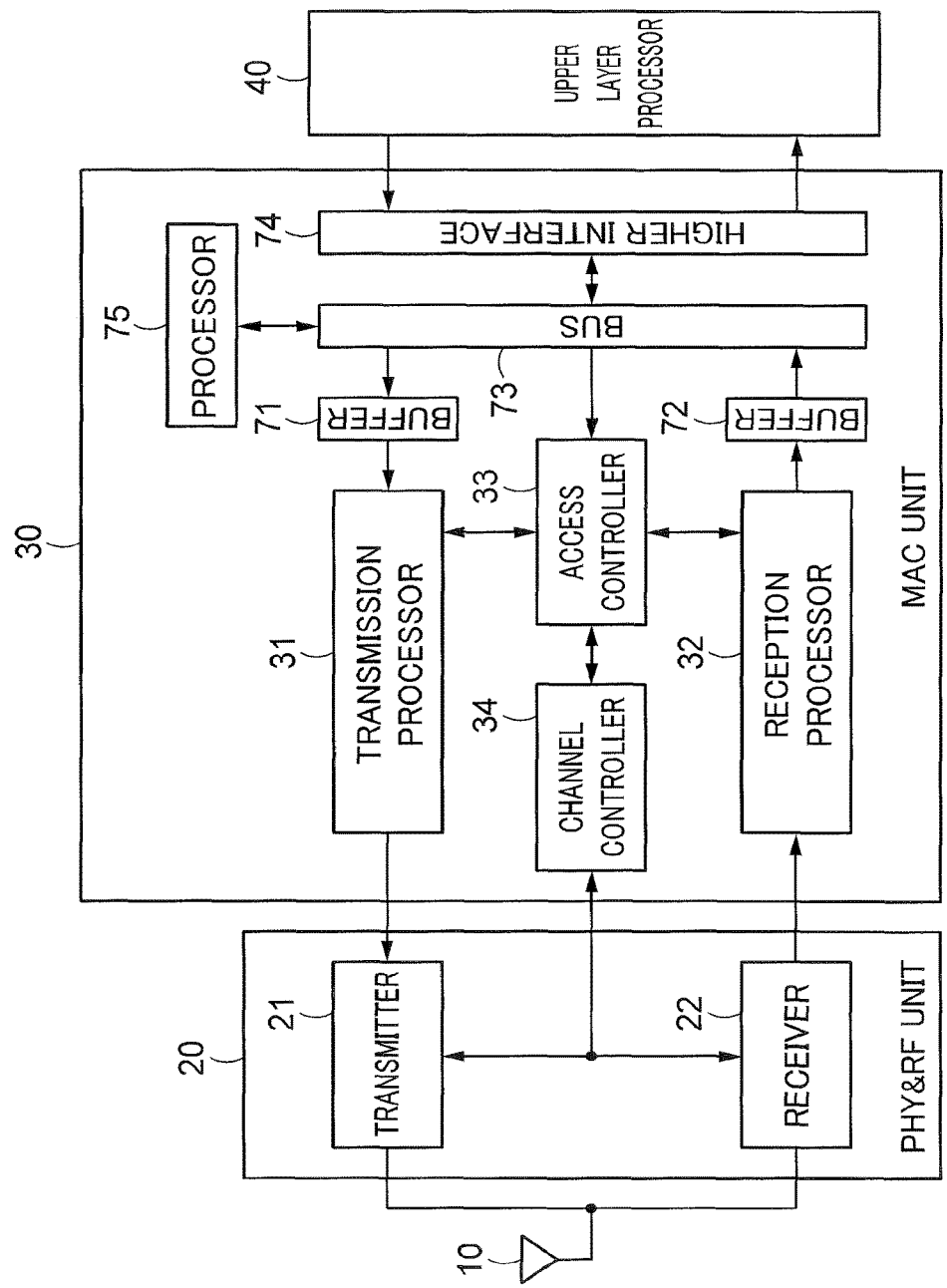
FIG. 15 is a block diagram of a wireless communication device provided for a hub according to a third embodiment.

FIG. 15 shows a block diagram of a hub including a wireless communication device according to a third embodiment.

The hub illustrated in FIG. 15 has a form that a bus 73 is connected to the buffers 71 and 72 and the access controller 33 in the fourth embodiment illustrated in FIG. 13, and an upper layer interface 74 and a processor 75 are connected to the bus 73. The MAC unit 30 is connected with the upper layer processor 40 at the upper layer interface 74. In the processor 75, firmware is operated. By rewriting the firmware, functions of the wireless communication device can be easily changed. The function of at least one of the access controller 33 and the channel controller 34 may be achieved by the processor 75.

Figure 16:
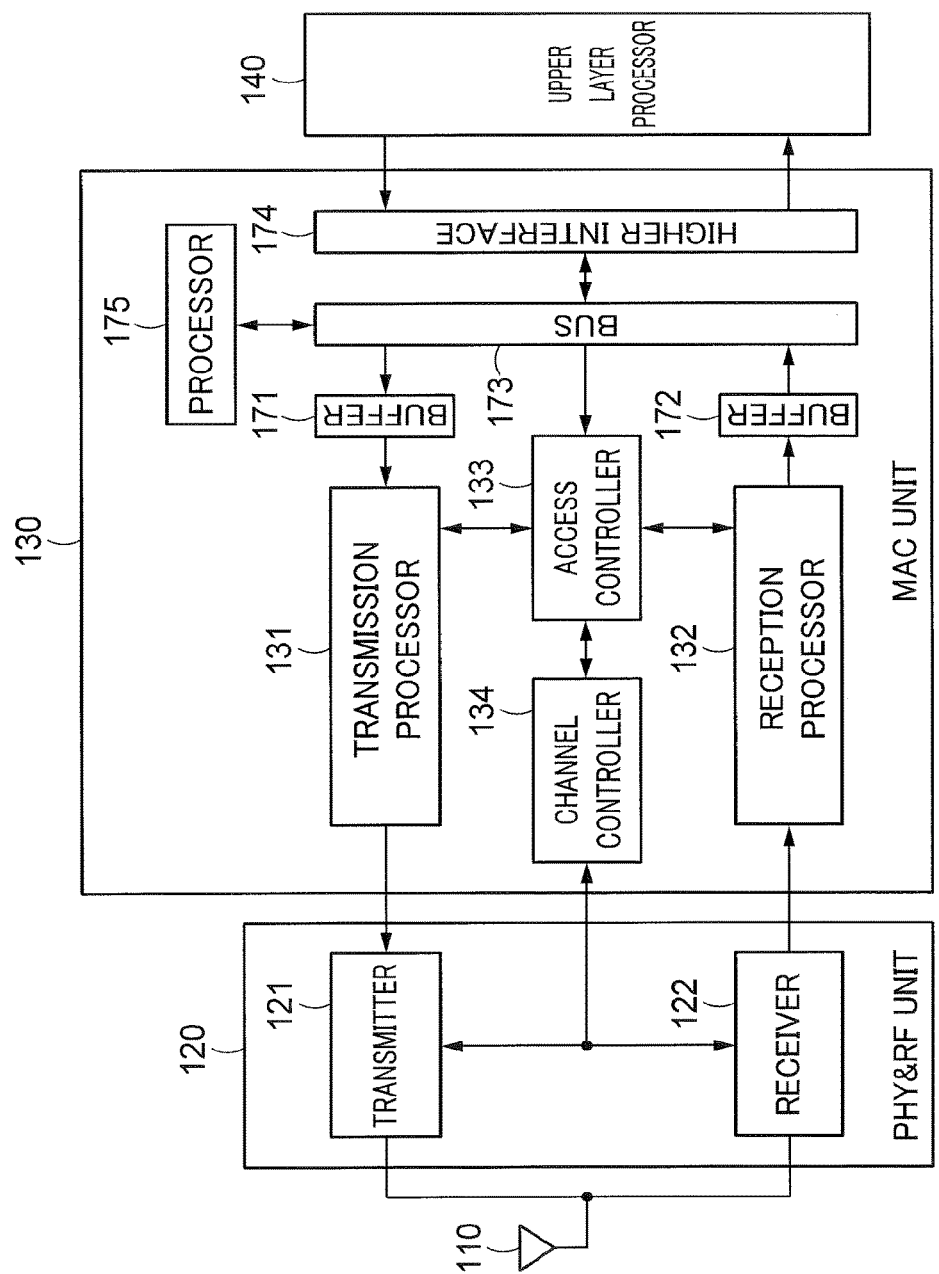
FIG. 16 is a block diagram of a wireless communication device provided for a node according to a third embodiment.

FIG. 16 shows a block diagram of a node including a wireless communication device according to a third embodiment.

The node illustrated in FIG. 16 has a form that a bus 173 is connected to the buffers 171 and 172 and the access controller 133 in the fourth embodiment illustrated in FIG. 14, and an upper layer interface 174 and a processor 175 are connected to the bus 173. The MAC unit 130 is connected with the upper layer processor 140 at the upper layer interface 174. In the processor 175, the firmware is operated. By rewriting the firmware, functions of the wireless communication device can be easily changed. The function of at least one of the access controller 133 and the channel controller 134 may be achieved by the processor 175.

(Fourth Embodiment)

Figure 17:
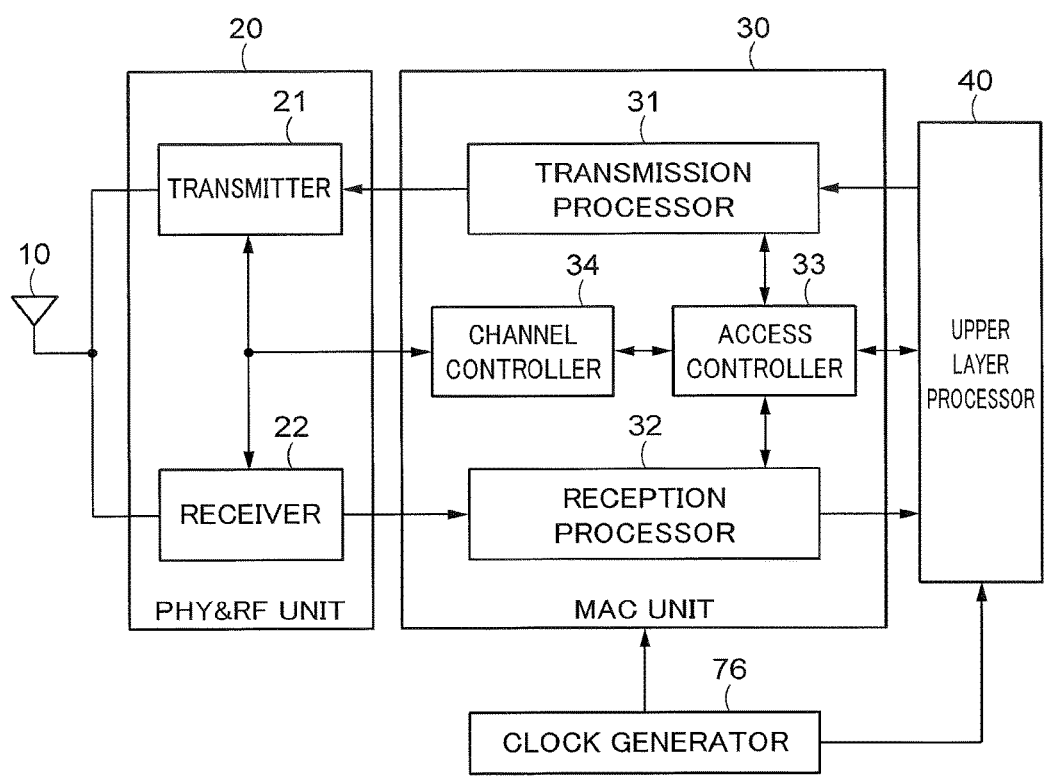
FIG. 17 is a block diagram of a wireless communication device provided for a hub according to a fourth embodiment.

FIG. 17 shows a block diagram of a hub including a wireless communication device according to a fourth embodiment.

The wireless communication device illustrated in FIG. 17 has a form that a clock generator 76 is connected to the MAC unit 30 in the hub relating to the first embodiment illustrated in FIG. 4. The clock generator 76 is connected through an output terminal to an external host (the upper layer processor 40 here), and a clock generated by the clock generator 76 is given to the MAC unit 30 and is also outputted to the external host. By operating the host by the clock inputted from the clock generator 76, a host side and a wireless communication device side can be operated in synchronism. In this example, the clock generator 76 is arranged on the outer side of the MAC unit 30, however, it may be provided inside the MAC unit 30.

Figure 18:
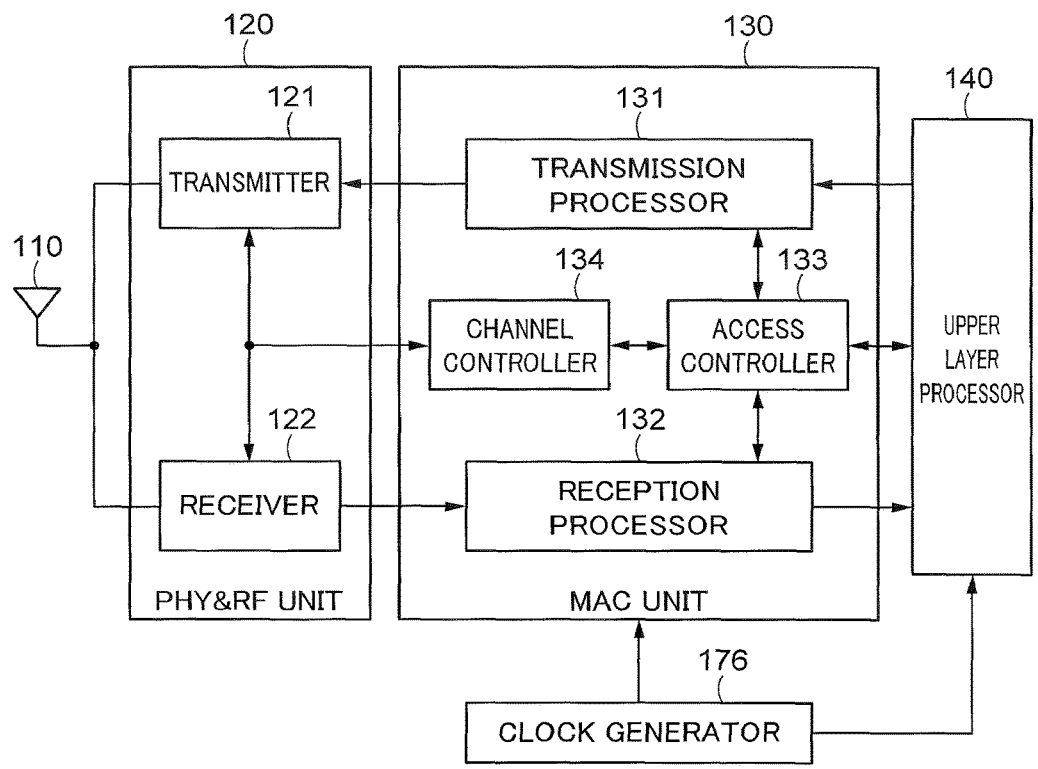
FIG. 18 is a block diagram of a wireless communication device provided for a node according to a fourth embodiment.

FIG. 18 shows a block diagram of a node including a wireless communication device according to a fourth embodiment.

The wireless communication device illustrated in FIG. 18 has a form that a clock generator 176 is connected to the MAC unit 130 in the node relating to the first embodiment illustrated in FIG. 5. The clock generator 176 is connected through an output terminal to an external host (the upper layer processor 140 here), and a clock generated by the clock generator 176 is given to the MAC unit 130 and is also outputted to the external host. By operating the host by the clock inputted from the clock generator 176, the host side and the wireless communication device side can be operated in synchronism. In this example, the clock generator 176 is arranged on the outer side of the MAC unit 130, however, it may be provided inside the MAC unit 130.

(Fifth Embodiment)

Figure 19:
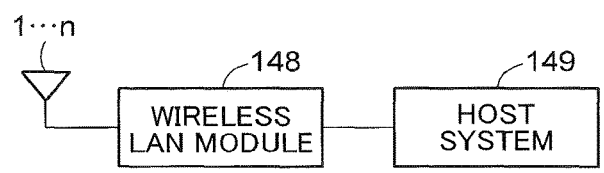
FIG. 19 is a diagram illustrating an example of an overall configuration of a hub or node according to a fifth embodiment.

FIG. 19 shows an example of entire configuration of a hub or a node. The example of configuration is just an example, and the present embodiment is not limited to this. The terminal or the base station includes one or a plurality of antennas 1 to n (n is an integer equal to or greater than 1), a wireless LAN module 148, and a host system 149. The wireless LAN module 148 corresponds to the wireless communication apparatus according to any one of the first to third embodiments. The wireless LAN module 148 includes a host interface and is connected to the host system 149 through the host interface. Other than the connection to the host system 149 through the connection cable, the wireless LAN module 148 may be directly connected to the host system 149. The wireless LAN module 148 can be mounted on a substrate by soldering or the like and can be connected to the host system 149 through wiring of the substrate. The host system 149 uses the wireless LAN module 148 and the antennas 1 to n to communicate with external apparatuses according to an arbitrary communication protocol. The communication protocol may include the TCP/IP and a protocol of a layer higher than that. Alternatively, the TCP/IP may be mounted on the wireless LAN module 148, and the host system 149 may execute only a protocol in a layer higher than that. In this case, the configuration of the host system 149 can be simplified. Examples of the present terminal include a mobile terminal, a TV, a digital camera, a wearable device, a tablet, a smartphone, a game device, a network storage device, a monitor, a digital audio player, a Web camera, a video camera, a projector, a navigation system, an external adaptor, an internal adaptor, a set top box, a gateway, a printer server, a mobile access point, a router, an enterprise/service provider access point, a portable device, and a hand-held device.

Figure 20:
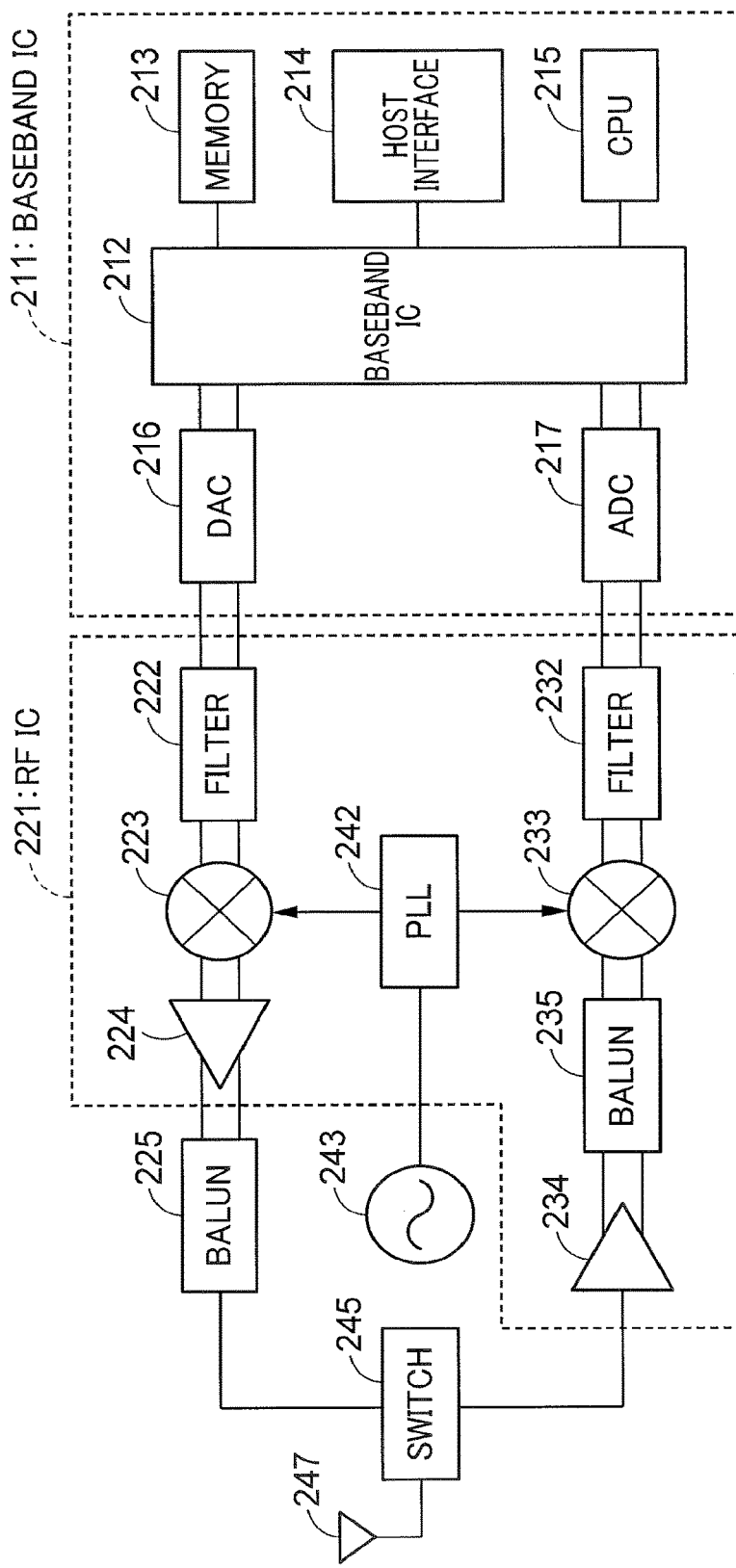
FIG. 20 is a hardware block diagram of a wireless communication device according to a fifth embodiment.

FIG. 20 shows an example of hardware configuration of a wireless LAN module. The configuration can also be applied when the wireless communication apparatus is mounted on either one of the terminal that is a non-base station and the base station. Therefore, the configuration can be applied as an example of specific configuration of the wireless communication apparatus shown in FIGS. 4 and 5. At least one antenna 247 is included in the example of configuration. When a plurality of antennas are included, a plurality of sets of a transmission system (216 and 222 to 225), a reception system (232 to 235), a PLL 242, a crystal oscillator (reference signal source) 243, and a switch 245 may be arranged according to the antennas, and each set may be connected to a control circuit 212. One or both of the PLL 242 and the crystal oscillator 243 correspond to an oscillator according to the present embodiment.

The wireless LAN module (wireless communication apparatus) includes a baseband IC (Integrated Circuit) 211, an RF (Radio Frequency) IC 221, a balun 225, the switch 245, and the antenna 247.

The baseband IC 211 includes the baseband circuit (control circuit) 212, a memory 213, a host interface 214, a CPU 215, a DAC (Digital to Analog Converter) 216, and an ADC (Analog to Digital Converter) 217.

The baseband IC 211 and the RF IC 221 may be formed on the same substrate. The baseband IC 211 and the RF IC 221 may be formed by one chip. Both or one of the DAC 216 and the ADC 217 may be arranged on the RF IC 221 or may be arranged on another IC. Both or one of the memory 213 and the CPU 215 may be arranged on an IC other than the baseband IC.

The memory 213 stores data to be transferred to and from the host system. The memory 213 also stores one or both of information to be transmitted to the terminal or the base station and information transmitted from the terminal or the base station. The memory 213 may also store a program necessary for the execution of the CPU 215 and may be used as a work area for the CPU 215 to execute the program. The memory 213 may be a volatile memory, such as an SRAM or a DRAM, or may be a non-volatile memory, such as a NAND or an MRAM.

The host interface 214 is an interface for connection to the host system. The interface can be anything, such as UART, SPI, SDIO, USB, or PCI Express.

The CPU 215 is a processor that executes a program to control the baseband circuit 212. The baseband circuit 212 mainly executes a process of the MAC layer and a process of the physical layer. One or both of the baseband circuit 212 and the CPU 215 correspond to the communication control apparatus that controls communication or the controller that controls communication.

At least one of the baseband circuit 212 and the CPU 215 may include a clock generator that generates a clock and may manage internal time by the clock generated by the clock generator.

For the process of the physical layer, the baseband circuit 212 performs addition of the physical header, coding, encryption, modulation process, and the like of the frame to be transmitted and generates, for example, two types of digital baseband signals (hereinafter, "digital I signal" and "digital Q signal").

The DAC 216 performs DA conversion of signals input from the baseband circuit 212. More specifically, the DAC 216 converts the digital I signal to an analog I signal and converts the digital Q signal to an analog Q signal. Note that a single system signal may be transmitted without performing quadrature modulation. When a plurality of antennas are included, and single system or multi-system transmission signals equivalent to the number of antennas are to be distributed and transmitted, the number of provided DACs and the like may correspond to the number of antennas.

The RF IC 221 is, for example, one or both of an RF analog IC and a high frequency IC. The RF IC 221 includes a filter 222, a mixer 223, a preamplifier (PA) 224, the PLL (Phase Locked Loop) 242, a low noise amplifier (LNA) 234, a balun 235, a mixer 233, and a filter 232. Some of the elements may be arranged on the baseband IC 211 or another IC. The filters 222 and 232 may be bandpass filters or low pass filters. The RF IC 221 is connected to the antenna 247 through the switch 245.

The filter 222 extracts a signal of a desired band from each of the analog I signal and the analog Q signal input from the DAC 216. The PLL 242 uses an oscillation signal input from the crystal oscillator 243 and performs one or both of division and multiplication of the oscillation signal to thereby generate a signal at a certain frequency synchronized with the phase of the input signal. Note that the PLL 242 includes a VCO (Voltage Controlled Oscillator) and uses the VCO to perform feedback control based on the oscillation signal input from the crystal oscillator 243 to thereby obtain the signal at the certain frequency. The generated signal at the certain frequency is input to the mixer 223 and the mixer 233. The PLL 242 is equivalent to an example of an oscillator that generates a signal at a certain frequency.

The mixer 223 uses the signal at the certain frequency supplied from the PLL 242 to up-convert the analog I signal and the analog Q signal passed through the filter 222 into a radio frequency. The preamplifier (PA) amplifies the analog I signal and the analog Q signal at the radio frequency generated by the mixer 223, up to desired output power. The balun 225 is a converter for converting a balanced signal (differential signal) to an unbalanced signal (single-ended signal). Although the balanced signal is handled by the RF IC 221, the unbalanced signal is handled from the output of the RF IC 221 to the antenna 247. Therefore, the balun 225 performs the signal conversions.

The switch 245 is connected to the balun 225 on the transmission side during the transmission and is connected to the balun 234 or the RF IC 221 on the reception side during the reception. The baseband IC 211 or the RF IC 221 may control the switch 245. There may be another circuit that controls the switch 245, and the circuit may control the switch 245.

The analog I signal and the analog Q signal at the radio frequency amplified by the preamplifier 224 are subjected to balanced-unbalanced conversion by the balun 225 and are then emitted as radio waves to the space from the antenna 247.

The antenna 247 may be a chip antenna, may be an antenna formed by wiring on a printed circuit board, or may be an antenna formed by using a linear conductive element.

The LNA 234 in the RF IC 221 amplifies a signal received from the antenna 247 through the switch 245 up to a level that allows demodulation, while maintaining the noise low. The balun 235 performs unbalanced-balanced conversion of the signal amplified by the low noise amplifier (LNA) 234. The mixer 233 uses the signal at the certain frequency input from the PLL 242 to down-convert, to a baseband, the reception signal converted to a balanced signal by the balun 235. More specifically, the mixer 233 includes a unit that generates carrier waves shifted by a phase of 90 degrees based on the signal at the certain frequency input from the PLL 242. The mixer 233 uses the carrier waves shifted by a phase of 90 degrees to perform quadrature demodulation of the reception signal converted by the balun 235 and generates an I (In-phase) signal with the same phase as the reception signal and a Q (Quad-phase) signal with the phase delayed by 90 degrees. The filter 232 extracts signals with desired frequency components from the I signal and the Q signal. Gains of the I signal and the Q signal extracted by the filter 232 are adjusted, and the I signal and the Q signal are output from the RF IC 221.

The ADC 217 in the baseband IC 211 performs AD conversion of the input signal from the RF IC 221. More specifically, the ADC 217 converts the I signal to a digital I signal and converts the Q signal to a digital Q signal. Note that a single system signal may be received without performing quadrature demodulation.

When a plurality of antennas are provided, the number of provided ADCs may correspond to the number of antennas. Based on the digital I signal and the digital Q signal, the baseband circuit 212 executes a process of the physical layer and the like, such as demodulation process, error correcting code process, and process of physical header, and obtains a frame. The baseband circuit 212 applies a process of the MAC layer to the frame. Note that the baseband circuit 212 may be configured to execute a process of TCP/IP when the TCP/IP is implemented.

More detailed processing of each block in the above device is apparent from the explanation of FIGS. 4 and 5 and redundant explanation is omitted.

(Sixth Embodiment)

Figure 21:
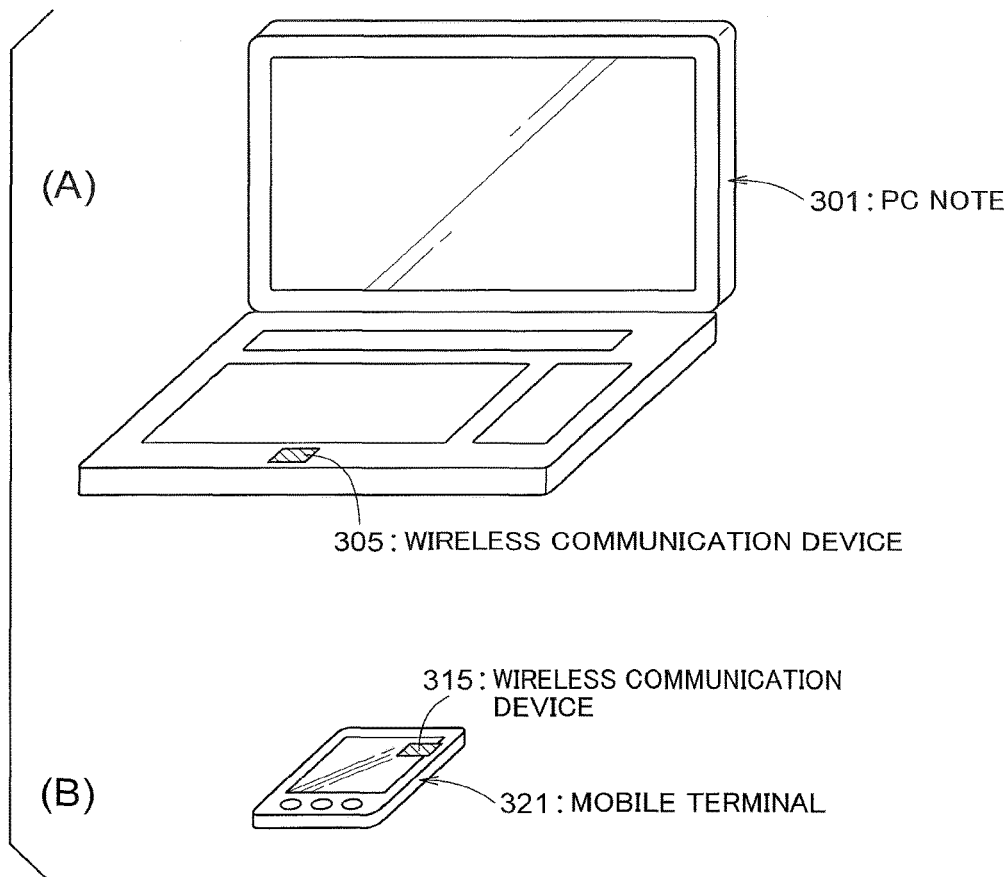
FIG. 21 is a perspective view of a wireless communication terminal according to a sixth embodiment.

FIG. 21(A) and FIG. 21(B) are perspective views of a wireless communication terminal (wireless device) in accordance with a sixth embodiment. The wireless device of FIG. 21(A) is a laptop PC 301 and the wireless device of FIG. 21(B) is a mobile terminal 321. They correspond, respectively, to one form of the terminal (which may operate as either the base station or the slave station). The laptop PC 301 and the mobile terminal 321 incorporate the wireless communication devices 305, 315, respectively. The wireless communication devices that are previously described may be used as the wireless communication devices 305, 315. The wireless device incorporating the wireless communication device is not limited to the laptop PC or the mobile terminal. For example, it can be installed in a TV, a digital camera, a wearable device, a tablet, a smart phone, a gaming device, a network storage device, a monitor, a digital audio player, a web camera, a video camera, a projector, a navigation system, an external adapter, an internal adapter, a set top box, a gateway, a printer server, a mobile access point, a router, an enterprise/service provider access point, a portable device, a handheld device and so on.

Figure 22:
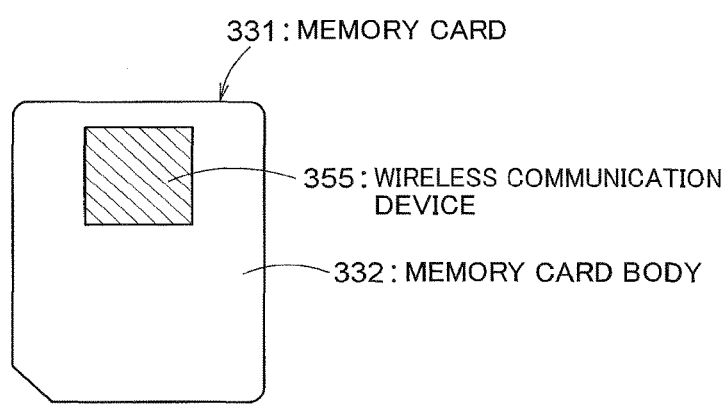
FIG. 22 is a diagram illustrating a memory card according to a sixth embodiment.

In addition, the wireless communication device can be incorporated in a memory card. FIG. 22 illustrates an example where the wireless communication device is incorporated in the memory card. The memory card 331 includes a wireless communication device 355 and a memory card body 332. The memory card 331 uses the wireless communication device 335 for wireless communications with external devices. It should be noted that the illustration of the other elements in the memory card 331 (e.g., memory, etc.) is omitted in FIG. 22.

(Seventh Embodiment)

A ninth embodiment includes a bus, a processor, and an external interface in addition to the configuration of the wireless communication device in accordance with any one of the first to sixth embodiments. The processor and the external interface are connected via the bus to the buffer. The firmware runs on the processor. In this manner, by providing a configuration where the firmware is included in the wireless communication device, it is made possible to readily modify the functionality of the wireless communication device by re-writing of the firmware.

(Eighth Embodiment)

A eighth embodiment includes a clock generator in addition to the configuration of the wireless communication device in accordance with any one of the first to sixth embodiments. The clock generator is configured to generate a clock and output the clock on the output terminal and to the outside of the wireless communication device. In this manner, by outputting the clock generated within the wireless communication device to the outside thereof and causing the host side to operate based on the clock output to the outside, it is made possible to cause the host side and the wireless communication device side to operate in a synchronized manner.

(Ninth Embodiment)

A ninth embodiment includes a power source, a power source controller, and a wireless power supply in addition to the configuration of the wireless communication device in accordance with any one of the first to sixth embodiments. The power source controller is connected to the power source and the wireless power supply, and is configured to perform control for selecting the power source from which power is supplied to the wireless communication device. In this manner, by providing a configuration where the power source is provided in the wireless communication device, it is made possible to achieve low power consumption operation accompanied by the power source control.

(Tenth Embodiment)

A tenth embodiment includes a SIM card in addition to the configuration of the wireless communication device in accordance with the ninth embodiment. The SIM card is connected to any block element in the wireless communication device; an access controller or a baseband IC, etc. In this manner, by providing a configuration where the SIM card is provided in the wireless communication device, it is made possible to readily perform the authentication processing.

(Eleventh Embodiment)

A eleventh embodiment includes a video compression/extension unit in addition to the configuration of the wireless communication device in accordance with the seventh embodiment. The video compression/extension unit is connected to a bus. In this manner, by configuring the video compression/extension unit included in the wireless communication device, it is made possible to readily perform transfer of the compressed video and the extension of the received compressed video.

(Twelfth Embodiment)

A twelfth embodiment includes an LED unit in addition to the configuration of the wireless communication device in accordance with any one of the first to sixth embodiments. The LED unit is connected to any block element in the wireless communication device; an access controller or a baseband IC, etc. In this manner, by providing a configuration where the LED unit is provided in the wireless communication device, it is made possible to readily notify the operating state of the wireless communication device to the user.

(Thirteenth Embodiment)

A thirteenth embodiment includes a vibrator unit in addition to the configuration of the wireless communication device in accordance with any one of the first to sixth embodiments. The vibrator unit is connected to any block element in the wireless communication device; an access controller or a baseband IC, etc. In this manner, by providing a configuration in which the vibrator unit is provided in the wireless communication device, it is made possible to readily notify the operating state of the wireless communication device to the user.

(Fourteenth Embodiment)

In a fourteenth embodiment, the configuration of the wireless communication device includes a display in addition to the configuration of the wireless communication device according to any one of the first to sixth embodiments. The display may be connected to any block element in the wireless communication device via a bus (not shown); an access controller or a baseband IC, etc. As seen from the above, the configuration including the display to display the operation state of the wireless communication device on the display allows the operation status of the wireless communication device to be easily notified to a user.

(Fifteenth Embodiment)

Figure 23:
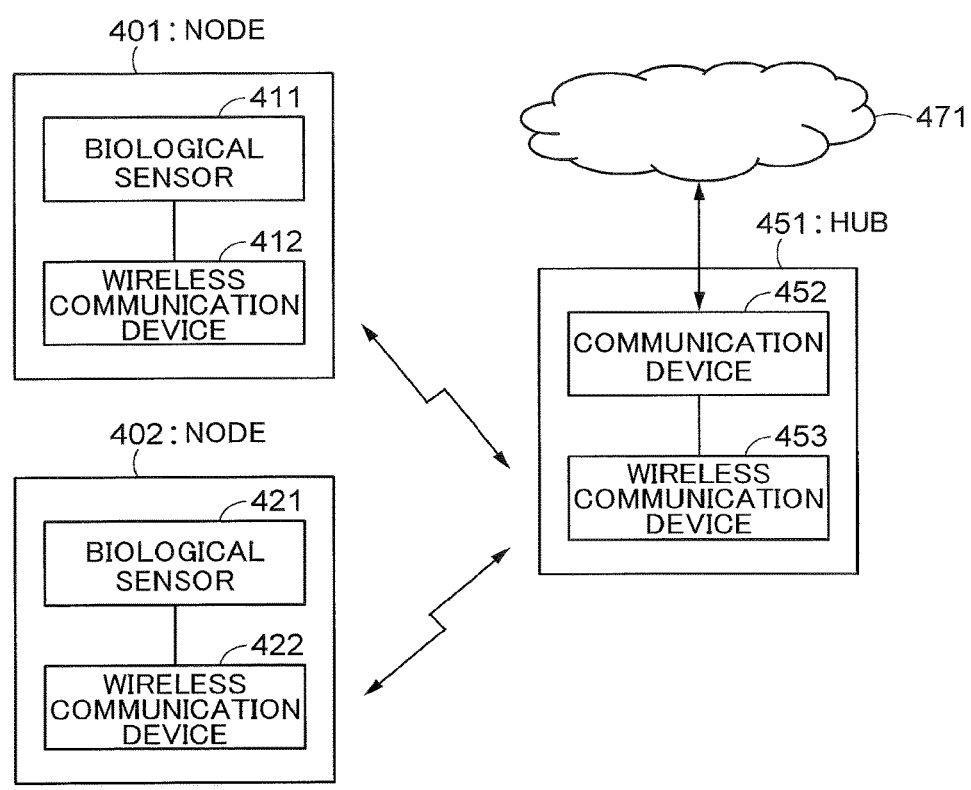
FIG. 23 is a diagram illustrating a wireless communication system according to a fifteenth embodiment.

FIG. 23 illustrates an overall configuration of a wireless communication system in accordance with a fifteenth embodiment. This wireless communication system is an example of the body area network. The wireless communication system includes a plurality of nodes including nodes 401, 402 and a hub 451. Each node and the hub are attached to the human body, and each node performs wireless communication with the hub 451. Being attached to the human body may refer to any case where it is arranged at a position near the human body such as a form in which it is in direct contact with the human body; a form in which it is attached thereto with clothes existing in between; a form in which it is provided on a strap hanging from the neck; and a form in which it is accommodated in a pocket. The hub 451 is, by way of example, a terminal including a smartphone, mobile phone, tablet, laptop PC, etc.

The node 401 includes a biological sensor 411 and a wireless communication device 412. As the biological sensor 411, for example, sensors may be used that are adapted to sense body temperature, blood pressure, pulse, electrocardiogram, heartbeat, blood oxygen level, urinal sugar, blood sugar, etc. Meanwhile, sensors adapted to sense biological data other than these may be used. The wireless communication device 412 is any one of the wireless communication devices of the embodiments that are described in the foregoing. The wireless communication device 412 performs wireless communication with the wireless communication device 453 of the hub 451. The wireless communication device 412 performs wireless transmission of the biological data (sensing information) sensed by the biological sensor 411 to the wireless communication device 453 of the hub 451. The node 401 may be configured as a device in the form of a tag.

The node 402 includes a biological sensor 421 and a wireless communication device 422. The biological sensor 421 and the wireless communication device 422, the explanations of which are omitted, are configured in the same or similar manner as the biological sensor 411 and the wireless communication device 412 of the node 401, respectively.

The hub 451 includes a communication device 452 and a wireless communication device 453. The wireless communication device 453 performs wireless communications with the wireless communication device of each node. The wireless communication device 453 may be the wireless communication device described in the context of the previous embodiments or may be another wireless communication device other than those described in the foregoing as long as it is capable of communications with the wireless communication device of the node. The communication device 452 is wire or wireless-connected to the network 471. The network 471 may be the Internet or a network such as a wireless LAN, or may be a hybrid network constructed by a wired network and a wireless network. The communication device 452 transmits the data collected by the wireless communication device 453 from the individual nodes to devices on the network 471. The delivery of data from the wireless communication device 453 to the communication devices may be performed via a CPU, a memory, an auxiliary storage device, etc. The devices on the network 471 may, specifically, be a server device that stores data, a server device that performs data analysis, or any other server device. The hub 451 may also incorporate a biological sensor in the same or similar manner as the nodes 401 and 402. In this case, the hub 451 also transmits the data obtained by the biological sensor to the devices on the network 471 via the communication device 452. An interface may be provided in the hub 451 for insertion of a memory card such as an SD card and the like and the data obtained by the biological sensor or obtained from each node may be stored in the memory card. In addition, the hub 451 may incorporate a user inputter configured to input various instructions by the user and a display for image display of the data, etc.

Figure 24:
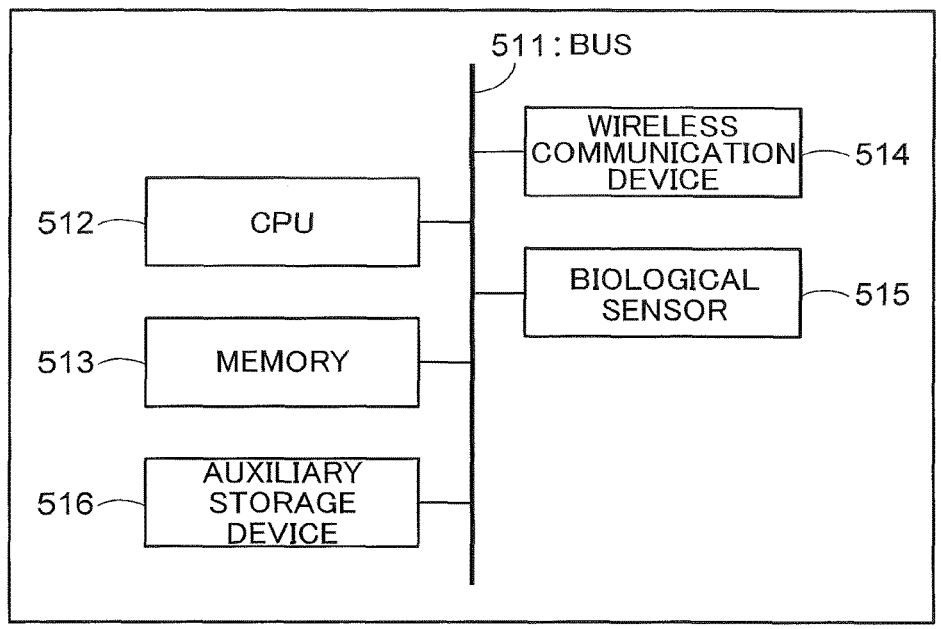
FIG. 24 is a hardware block diagram of a node according to a fifteenth embodiment.

FIG. 24 is a block diagram illustrating a hardware configuration of the node 401 or node 402 illustrated in FIG. 23. The CPU 512, the memory 513, the auxiliary storage device 516, the wireless communication device 514, and the biological sensor 515 are connected to a bus 511. Here, the individual components 512 to 516 are connected to one single bus, but a plurality of buses may be provided by a chipset and the individual units 512 to 516 may be connected in a distributed manner to the plurality of buses. The wireless communication device 514 corresponds to the wireless communication devices 412, 422 of FIG. 23, and the biological sensor 515 corresponds to the biological sensor 411, 421 of FIG. 23. The CPU 512 controls the wireless communication device 514 and the biological sensor 515. The auxiliary storage device 516 is a device that permanently stores data such as an SSD, a hard disk, etc. The auxiliary storage device 516 stores a program to be executed by the CPU 512. In addition, the auxiliary storage device 516 may store data obtained by the biological sensor 515. The CPU 512 reads the program from the auxiliary storage device 516, develops it in the memory 513, and thus executes it. The memory 513 may be volatile memory such as DRAM, etc., or may be non-volatile memory such as MRAM, etc. The CPU 512 drives the biological sensor 515, stores data obtained by the biological sensor 515 in the memory 513 or the auxiliary storage device 516, and transmits the data to the hub via the wireless communication device 514. The CPU 512 may execute processing associated with communication protocols of layers higher than the MAC layer and processing associated with the application layer.

Figure 25:
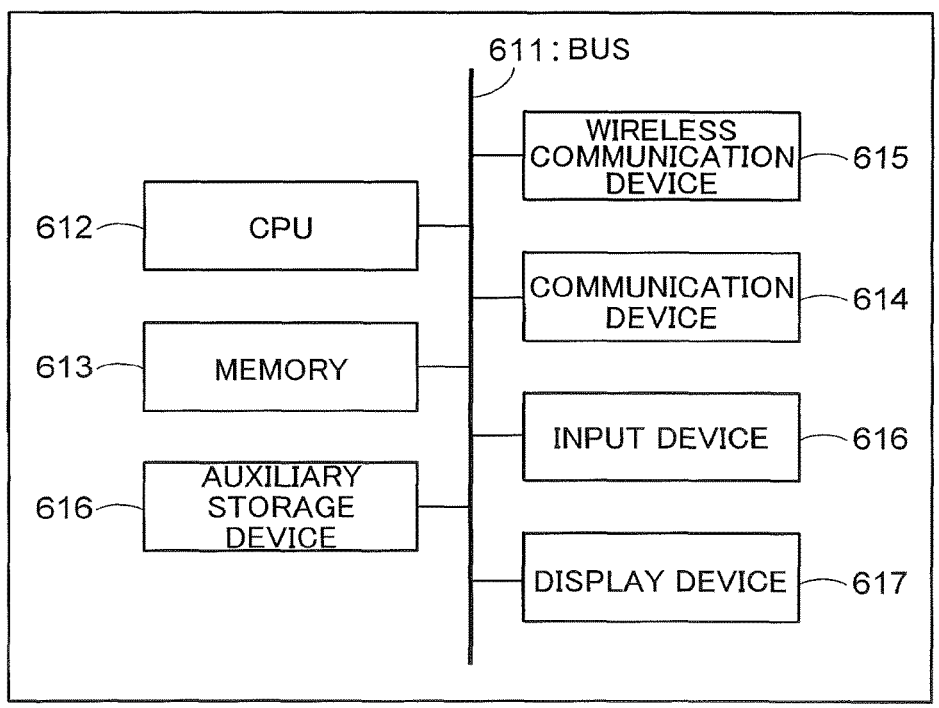
FIG. 25 is a hardware block diagram of a hub according to a fifteenth embodiment.

FIG. 25 is a block diagram that illustrates a hardware configuration of the hub 451 illustrated in FIG. 23. A CPU 612, a memory 613, an auxiliary storage device 616, a communication device 614, a wireless communication device 615, an inputter 616 and a display 617 are connected to a bus 611. Here, the individual units 612 to 617 are connected to one single bus, but a plurality of buses may be provided by a chipset and the individual units 612 to 617 may be connected in a distributed manner to the plurality of buses. A biological sensor or a memory card interface may further be connected to the bus 611. The inputter 616 is configured to receive various instruction inputs from the user and output signals corresponding to the input instructions to the CPU 612. The display 617 provides image display of the data, etc. as instructed by the CPU 612. The communication device 614 and the wireless communication device 615 correspond to the communication device 452 and the wireless communication device 453 provided in the hub of FIG. 23, respectively. The CPU 612 controls the wireless communication device 615 and the communication device 614. The auxiliary storage device 616 is a device that permanently stores data such as an SSD, a hard disk, etc. The auxiliary storage device 616 stores a program executed by the CPU 612 and may store data received from each node. The CPU 612 reads the program from the auxiliary storage device 616, develops it in the memory 613, and executes it. The memory 613 may be volatile memory such as DRAM, etc., or may be non-volatile memory such as MRAM, etc. The CPU 612 stores data received by the wireless communication device 615 from each node in the memory 613 or the auxiliary storage device 616, and transmits the data to the network 471 via the communication device 614. The CPU 612 may execute processing associated with communication protocols of layers higher than the MAC layer and processing associated with the application layer.

The terms used in each embodiment should be interpreted broadly. For example, the term "processor" may encompass a general purpose processor, a central processing unit (CPU), a microprocessor, a digital signal processor (DSP), a controller, a microcontroller, a state machine, and so on. According to circumstances, a "processor" may refer to an application specific integrated circuit (ASIC), a field programmable gate array (FPGA), and a programmable logic device (PLD), etc. The term "processor" may refer to a combination of processing devices such as a plurality of microprocessors, a combination of a DSP and a microprocessor, or one or more microprocessors in conjunction with a DSP core.

As another example, the term "memory" may encompass any electronic component which can store electronic information. The "memory" may refer to various types of media such as a random access memory (RAM), a read-only memory (ROM), a programmable read-only memory (PROM), an erasable programmable read only memory (EPROM), an electrically erasable PROM (EEPROM), a non-volatile random access memory (NVRAM), a flash memory, and a magnetic or optical data storage, which are readable by a processor. It can be said that the memory electronically communicates with a processor if the processor read and/or write information for the memory. The memory may be arranged within a processor and also in this case, it can be said that the memory electronically communication with the processor. The term "circuitry" may refer to not only electric circuits or a system of circuits used in a device but also a single electric circuit or a part of the single electric circuit.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A wireless communication device comprising:
controlling circuitry configured to:
determine one of a first radio frequency band and a second radio frequency band under a first condition for a selection of a data channel used for a communication of data, wherein the first radio frequency band includes a plurality of first candidate channels and has no usage limitation of data communication, the second radio frequency band includes a plurality of second candidate channels and has a usage limitation of data communication, a number of the second candidate channels in the second radio frequency band is less than a number of the first candidate channels in the first radio frequency band, and signal interferences in the second radio frequency band is less than signal interferences in the first radio frequency band;
determine one of the first radio frequency band and the second radio frequency band under a second condition for a selection of a control channel used for a communication of control information on the data channel, wherein the second condition is different from the first condition, and the control channel is different from the data channel;
select the data channel from the first candidate channels when the first radio frequency band is determined for the selection of the data channel;
select the data channel from the second candidate channels when the second radio frequency band is determined for the selection of the data channel;
select the control channel from the second candidate channels when the second radio frequency band is determined for the selection of the control channel; and
select the control channel from the first candidate channels when the first radio frequency band is determined for the selection of the control channel; and
a transmitter configured to periodically transmit a first beacon signal through the data channel and periodically transmit a second beacon signal through the control channel, the second beacon signal including the control information on the data channel.

2. The wireless communication device according to claim 1, wherein in the second radio frequency band, a carrier sensing is performed for at least a predetermined period before transmitting a signal and the signal is allowed to be transmitted when a carrier sensing result is idle.

3. The wireless communication device according to claim 1, wherein the controlling circuitry is configured to measure a radio wave condition of the control channel selected from the second candidates channels and switch, when the radio wave condition does not satisfy an operating condition of the control channel, the control channel to another one of the second candidate channels in the second radio frequency band.

4. The wireless communication device according to claim 1, wherein the controlling circuitry is configured to measure a radio wave condition of the control channel selected from the second candidate channels and switch, when the radio wave condition does not satisfy an operating condition of the control channel, the control channel to one of the first candidate channels in the first radio frequency band.

5. The wireless communication device according to claim 1, wherein the controlling circuitry is configured to select the control channel from the first candidate channels in the first radio frequency band, measure a radio wave condition of the control channel and switch, when the radio wave condition does not satisfy an operating condition of the control channel, the control channel to one of the second candidate channels in the second radio frequency band.

6. The wireless communication device according to claim 1, wherein the controlling circuitry is configured to check availability of each first candidate channel in the first radio frequency band through a carrier sensing and select, when no candidate is available, the data channel from the second candidate channels in the second radio frequency band.

7. The wireless communication device according to claim 1, wherein the controlling circuitry is configured to measure whether a communication load on the wireless communication device is large or not based on a communication situation of the data channel selected from the first candidate channels in the first radio frequency band and select, when the communication load is large, the data channel from the second candidate channels in the second radio frequency band, and switch the data channel to one of the second candidate channels in the second radio frequency band.

8. The wireless communication device according to claim 1, wherein the controlling circuitry is configured to determine whether there is the second radio frequency band based on first information, select, when there is the second radio frequency band, the control channel from the second candidate channels in the second radio frequency band, and select, when there is no second radio frequency band, the control channel from the first candidate channels in the first radio frequency band.

9. The wireless communication device according to claim 8, wherein the first information includes information on at least one of a country, a region and a position where the wireless communication device exists.

10. The wireless communication device according to claim 8, wherein the wireless communication device operates as a base station,
the controlling circuitry is configured to specify a control channel used by another base station through a channel scanning, and
the first information includes information on the control channel used by the other base station.

11. The wireless communication device according to claim 1, wherein the wireless communication device is a hub in a body area network including the hub and nodes.

12. The wireless communication device according to claim 1, wherein the controlling circuitry is configured to communicate with a plurality of wireless communication devices through the data channel using time slots assigned to the plurality of wireless communication devices.

13. The wireless communication device according to claim 1, wherein the first radio frequency band is an industry-science-medical (ISM) band, and the second radio frequency band is a medical (M) band.

14. The wireless communication device according to claim 1, further comprising at least one antenna.

15. A wireless communication device comprising:
a receiver configured to receive a first beacon signal through a data channel used for a communication of data and receive a second beacon signal through a control channel used for a communication of control information on the data channel wherein the data channel is different from the control channel, each of the data channel and the control channel is selected from a plurality of first candidate channels in a first radio frequency band or from a plurality of second candidate channels in a second radio frequency band, the first radio frequency band has no usage limitation of data communication, and the second radio frequency band has a usage limitation of data communication, a number of the second candidate channels in the second radio frequency band is less than a number of the first candidate channels in the first radio frequency band, and signal interferences in the second radio frequency band is less than signal interferences in the first radio frequency band; and
controlling circuitry is configured to:
determine preferentially the second radio frequency band as a radio frequency band for searching the control channel, check whether the second beacon signal is received through any one of the second candidate channels in the second radio frequency band,
determine, when the second beacon signal is received through any one of the second candidate channels in the second radio frequency band, the control channel to the second candidate channel through which the second beacon signal is received in the second radio frequency band,
check, when the second beacon signal is received through none of the second candidate channels in the second radio frequency band, whether the second beacon signal is received through any one of the first candidate channels in the first radio frequency band,
determine, when the second beacon signal is received through any of the first candidate channels in the first radio frequency band, the control channel to the first candidate channel through which the second beacon signal is received in the first radio frequency band, and
specify the data channel based on the second beacon signal received through the determined control channel.

16. The wireless communication device according to claim 15, wherein the controlling circuitry is configured to check whether the second beacon signal is received through the second candidate channels in each of a plurality of the second radio frequency bands and check, when the second beacon signal is received through none of the second candidate channels in the second radio frequency bands, whether the second beacon signal is received through the first candidate channels in the first radio frequency band.

17. The wireless communication device according to claim 15, wherein the wireless communication device is a node in a body area network including a hub and nodes.

18. The wireless communication device according to claim 15, wherein the controlling circuitry is configured to communicate using a time slot assigned thereto.

19. The wireless communication device according to claim 15, wherein the first radio frequency band is an industry-science-medical (ISM) band, and the second radio frequency band is a medical (M) band.

20. The wireless communication device according to claim 15, further comprising at least one antenna.

* * * * *